(12) United States Patent
Ghandi et al.

(10) Patent No.: US 7,239,771 B2
(45) Date of Patent: Jul. 3, 2007

(54) METHOD AND SYSTEM FOR CONTROLLING AN OPTICAL SWITCH USING DYNAMIC COMPENSATION

(75) Inventors: Kamyar Ghandi, Arlington, MA (US); Nesbitt Ward Hagood, IV, Wellesley, MA (US); Timothy Scott Glenn, Somerville, MA (US)

(73) Assignee: Polatis Photonics, Inc., Billerica, MA (US)

( * ) Notice: Subject to any disclaimer, the term of this patent is extended or adjusted under 35 U.S.C. 154(b) by 0 days.

(21) Appl. No.: 11/235,618

(22) Filed: Sep. 26, 2005

(65) Prior Publication Data

US 2006/0018591 A1    Jan. 26, 2006

Related U.S. Application Data

(62) Division of application No. 10/392,371, filed on Mar. 18, 2003, now Pat. No. 6,975,785.

(60) Provisional application No. 60/365,457, filed on Mar. 18, 2002.

(51) Int. Cl.
*G02B 6/26* (2006.01)

(52) U.S. Cl. .............................. 385/16; 385/22; 385/47
(58) Field of Classification Search ............ 385/16–19, 385/24, 31–37, 15, 147, 47, 48; 398/39, 398/79, 45, 107, 139, 140, 167; 702/85; 356/121

See application file for complete search history.

(56) References Cited

U.S. PATENT DOCUMENTS 4,657,339 A    4/1987    Fick (Continued)

FOREIGN PATENT DOCUMENTS

WO    WO 00/76106 A1    12/2000

(Continued)

OTHER PUBLICATIONS

Ford, J. E., et al., "Micromechanical Fiber-Optic Attenuator with 3 μs Response," *Journal of Lightwave Technology*, 16(9):1663-1670 (1998).

(Continued)

*Primary Examiner*—Hemang Sanghavi
(74) *Attorney, Agent, or Firm*—Hamilton, Brook, Smith & Reynolds, P.C.

(57) ABSTRACT

A free space optical switch that uses both an open loop control mode and a closed loop control mode. The open loop control mode is used to transition to a state where at least some light is sensed at a destination port. A closed loop control mode is then used, whereby a series of controlled dither signals are adjusted for system dynamics. Modifying the dither signals in this matter allows moving actuators at a rate that is much closer to the natural frequency of the underlying system, and hence speeds up the system convergence process. Variable modulation amplitudes may be employed on the dither signals to maximize convergence speed. In particular, changes in the dither signal can be made in accordance with the change in amplitude as a function of a gradient along a parabola that models the optical system response. According to still further aspects, the dither signals may be compensated for a desired and selectable attenuation level of output optical power.

28 Claims, 9 Drawing Sheets

U.S. PATENT DOCUMENTS

| | | | |
|---|---|---|---|
| 5,177,348 A | | 1/1993 | Laor |
| 5,323,256 A | * | 6/1994 | Banks ..................... 398/111 |
| 5,450,508 A | | 9/1995 | Decusatis et al. |
| 5,517,998 A | * | 5/1996 | Madison ..................... 600/473 |
| 5,539,201 A | * | 7/1996 | Liva et al. ............. 250/227.21 |
| 5,625,583 A | * | 4/1997 | Hyatt ........................ 365/45 |
| 5,657,405 A | * | 8/1997 | Fujiwara ..................... 385/12 |
| 5,809,220 A | * | 9/1998 | Morrison et al. ............. 714/12 |
| 6,137,941 A | | 10/2000 | Robinson |
| 6,222,954 B1 | | 4/2001 | Riza |
| 6,263,123 B1 | | 7/2001 | Bishop et al. |
| 6,345,134 B1 | | 2/2002 | Laming et al. |
| 6,411,751 B1 | | 6/2002 | Giles et al. |
| 6,484,114 B1 | | 11/2002 | Dickson |
| 6,539,142 B2 | * | 3/2003 | Lemoff et al. ................ 385/18 |
| 6,556,285 B1 | | 4/2003 | Dickson |
| 6,788,844 B2 | | 9/2004 | Ng |
| 2002/0085806 A1 | * | 7/2002 | Pezeshki et al. ............. 385/31 |
| 2003/0048984 A1 | | 3/2003 | Ng |
| 2003/0202798 A1 | * | 10/2003 | Chou et al. ................ 398/159 |

FOREIGN PATENT DOCUMENTS

| | | |
|---|---|---|
| WO | WO 02/01274 A2 | 1/2002 |
| WO | WO 03/016958 A2 | 2/2003 |
| WO | WO 03/016980 A1 | 2/2003 |

OTHER PUBLICATIONS

Datta, K. B. and Mohan, B. M., "Chapter 4: Analysis of Time-Delay Systems," pp. 127-129, and "Chapter 8: Optimal Control of Linear Systems," pp. 213-234, in *Orthogonal Functions in Systems and Control* (Singapore: World Scientific Publishing Co. Pte. Ltd.) (1995).

Patra, A. and Rao, G. P., "Continuous-time Model-based Self-tuning Control," In *General Hybrid Orthogonal Functions and their Applications in Systems and Control*, M. Thoma, ed. (London: Springer-Verlag London Limited), pp. 71-84 (1996).

Riza, N. A. and Sumriddetchkajorn, S., "Versatile multi-wavelength fiber-optic switch and attenuator structures using mirror manipulations," *Optics Communications*, 169:233-244 (1999).

Sumriddetchkajorn, S. and Riza, N. A., "Fault-tolerant three-port-fiber-optic attenuator using small tilt micromirror device," *Optics Communications*, 205:77-86 (2002).

Ji, C., et al., "Electromagnetic Variable Optical Attenuator," *IEEE/LEOS International Conference on Optical MEMs conference digest*, pp. 49-50 (2002).

Li, J., et al., "A Micromachined Variable Optical Attenuator (VOA)," *Proceedings of the SPIE-International Society for Optical Engineering*, 4582:112-120 (2001).

Endow, Y., "Optimal Control Via Fourier Series of Operational Matrix of Integration," *IEEE Transactions on Automatic Control*, 34(7):770-773 (1989).

Palanisamy, K. R., "Analysis and optimal control of linear systems via single term Walsh series approach," *Int. J. Systems Sci.*, 12(4):443-454 (1981).

Razzaghi, M., "Solution of Linear Two-point Boundary Value Problems via Fourier Series and Application to Optimal Control of Linear Systems," *Journal of the Franklin Institute*, 326(4):523-533 (1989).

* cited by examiner

METHOD AND SYSTEM FOR CONTROLLING AN OPTICAL SWITCH USING DYNAMIC COMPENSATION

RELATED APPLICATIONS

This application is a divisional of U.S. application Ser. No. 10/392,371, filed Mar. 18, 2003, now U.S. Pat. No. 6,975,785, which claims the benefit of U.S. Provisional Application No. 60/365,457 entitled "Method and Apparatus for Switching or Attenuating Optical Signals," filed Mar. 18, 2002. The entire teachings of these applications, are hereby incorporated herein by reference.

BACKGROUND OF THE INVENTION

This invention relates to a beam steering optical switch and in particular to a control system for a free-space optical cross-connect switch with actuation, such as piezoelectric actuation, or any other micro-optical positioning or beam-steering device.

Communication signals are now commonly transmitted across networks using compact optical fiber bundles that support substantial transmission capacity. Given the ever-increasing demands for improved signal quality and bandwidth, it is anticipated that fiber optic communications will continue to supplant copper wire based technologies for many years to come.

One of the reasons that fiber optic communication networks have attracted much attention relates to their higher bandwidth over previous network technologies. Fiber optic communication networks are composed of a large number of fiber optic lines that can carry many optical signals (e.g., Dense Wavelength Division Multiplexing (DWDM)). At junction nodes, where the fiber optic lines interconnect, the optical signals carried on these fiber optic lines are exchanged. The connections can be made by a variety of cross-connect switches, where any given optical signal on an input line brought to the junction can be switched to any output line at that junction under operation of a controller. So-called "all-optical" switches (i.e., with no optical-to-electrical conversions), that can switch signals while they are still in pure optical form, are an efficient and effective way to enable these functions in optical networks. To be effective, switches need to switch at high speed to support network provisioning, protection switching, and other network functions. However, it will be appreciated that there is a continuous desire to increase the speed of operation and reduce signal losses at these switch interfaces.

A typical all-optical free-space cross-connect switch consists of a fabric of optical emitters that launch a collimated optical beam, and another fabric of optical receivers. The emitters can be selectively connected to the receivers by varying the direction of the emitted collimated beam so as to impinge on a selected receiver. Any combination of active and/or passive emitters and/or receivers can be combined to form 1×N, N×1, N×N or M×N switch fabrics.

Many all-optical free-space cross-connect switches have been reported that either redirect a collimated beam that is launched in a fixed direction, or control the direction of a collimated beam. Switches that redirect a fixed collimated beam typically rely on an arrangement of micro-mirrors that can be tilted, typically by applying an electrostatic force. Switches that directly control the beam direction have optical elements that rotate, translate, or tilt in response to an applied actuation signal. The motion of the optical elements move the position of an optical emitter, such as a fiber tip, relative to the optical axis of a collimating lens, in order to vary the angle of the beam. Both types of optical switches can advantageously employ Micro-Electro-Mechanical Systems (MEMS) technology, with actuation provided by mechanical, electromagnetic, piezoelectric, photoactive ceramic or polymer, thermal, chemically-active polymer, electrostrictive, shape-memory alloy or ceramic, hydraulic and/or magnetostrictive actuators and other types of actuators known in the art.

There are a number of factors that limit the speed at which such optical switches can operate. One limitation results from the requirement to accurately align the ends of the fibers as they are moved to a new position. Precise alignment accuracy is required to minimize signal losses. In this regard, it will be appreciated that even slight misalignments of the fiber ends will result in a significant loss of the power of the transmitted optical signal and, potentially, of the information encoded in the communication signal. Moreover, switch designers are continuously striving to accommodate more fibers in smaller switches.

Recently, optical emitters with a controlled beam pointing direction have been proposed that incorporate actuators, such as piezoelectric or electrostrictive actuators. Actuators advantageously provide a fast response, produce large forces, have a high characteristic frequency for fast switching. Additionally, they are low-cost and have low susceptibility to vibration.

Various control techniques have been employed to control the beam pointing, thereby controlling the rate of switching, in free-space optical switches. For example, U.S. Pat. No. 6,484,114 issued to Dickson describes a method for calibrating a free space coupled fiber optic transmission system. The method uses signal content in a measure of the coupled power, specifically at frequencies equal to a sum, difference, and first harmonics of the frequencies of a control dither signal. A signal so detected can be used to infer and correct errors in a kinematic model used to apply the dithers. The technique described by Dickson is similar to other techniques that use open-loop oscillatory mirror commands (i.e., dithers) to detect alignment errors and/or intentional optical power attenuation.

In addition, U.S. Pat. No. 6,097,858 issued to Laor describes a control system for an optical switch that has a number of movable mirror surfaces that permit adjustment of the optical paths. In this approach, control signal receiving elements are separated, i.e., physically located away from, the ends of target fiber optics. This configuration, which is especially useful for stationary fiber ends, can be used in conjunction with targeting optics that use an off-path or secondary sensor provided as part of a fiber optic control system, where the off-path sensor uses a light source other than a signal, such a an information carrying signal, in the fiber optic light path.

SUMMARY OF THE INVENTION

However, these prior art techniques have certain shortcomings. Consider first that MEMS and other actuators can apply a significant amount of mechanical force. These permit one to rapidly move or tilt a mirror and/or move the position of fiber tip end to steer the optical beam. For example, high natural frequencies of 1200 Hertz (Hz) or more can be accomplished with such actuators. This is at first instance quite an advantage, since providing a significant and strong motion force can assist with quickly setting the switch to a new position.

However, in order to optimize the speed of such a switch, knowledge of system dynamics should be employed. Specifically, with such mechanical actuators there is a lag between the application of the control signal at a position input and observation of the resulting response, i.e., observing that the beam is actually steered to a new output position. Such lags are due the acceleration and velocity response characteristics of the mechanical components. While one could wait for such system responses to settle out (indeed some prior art systems do actually wait for such dynamics to settle) this approach does not provide for the fastest possible switching speed. When the goal is to achieve as fast as possible a switching time, there is a need to compensate for these system dynamics.

The present invention takes several approaches to solving this problem. In accordance with one particular aspect, the invention uses a control system that has both an open-loop control mode and a closed-loop control mode, both of which generate a control signal with respect to the same or different optical power sensors.

In this control system, the optical power sensor output can be obtained by detecting a small portion of the optical communication signal on a receiving end or target location, and feeding it to an optical intensity sensor. This provides a direct measure of the optical beam power to be used for system control. Optionally, instead of measuring the optical communication signal, a reference optical signal is coupled to the input side of the device and measured using a wavelength-selective tap coupled to the target. Still further, measuring the optical communication signal and reference optical signal may be done at both the receiving side and input side, respectively, allowing for a direct differential measurement.

The open loop control mode is used to transition from an initial state to a state where at least some light is sensed at a destination port by the sensor. Open loop control can be provided by storing in a look-up table, for example, a differential charge to move an input port device to aim at a particular destination port device. These differential charges may be predetermined and stored in the look-up table during calibration and used in a first open loop mode of the system.

The closed loop control mode is then used after this point. Since the system actuators are hysteretic in nature, the closed-loop mode adjusts a series of control signals to compensate for such system dynamics. In particular, the invention incorporates knowledge of the dynamics of the mechanical actuator system into a feedback system that controls the source points, target points, or both to control the coupled optical power. The system applies a dither signal to a control signal to assist in control of the source and target points. Modifying the control signal in this matter allows moving the actuators at a rate that is much closer to the natural frequency of the underlying system, and hence speeds up the system convergence process.

More particularly, a transition from the open loop state to a closed loop state can occur upon detection of a predetermined minimum optical power at the sensor.

In one embodiment, the dither signals may be one or more sinusoidal, oscillatory signals to cause small repetitive movement along a particular motion axis. Feedback-controlled mean location and dithering of the beam alignment eventually produces a coupled power output at a constant level when the alignment error integrates to a zero value, and the model parameters of the dither system are properly set. For example, when the alignment errors are zeroed out, a sinusoidal dither signal and related orthogonal co-sinusoidal dither signal at a given frequency, whether above or below the natural resonance of the system, will produce a circular trajectory as the two alignment errors cancel. Since the sum of the squares of the two alignment errors is constant, the result will be a constant attenuated coupled power even though the individual errors do not change.

In further aspects of the preferred embodiment, the dither signals are filtered to compensate for a dynamic response of the beam direction control element that occurs as a result of application of the dither signals themselves. Specifically, rather than develop a kinematic model of the system, such as some have done in the prior art, the present invention compensates for changes in system responses that are a result of application of different starting beam position state and control signal values.

For example, phase lag, phase lead, and amplitude changes may be observed in the response of the beam direction control unit and excited by higher frequency dither signals. The present invention provides adjusted dither signals that are compensated for dynamic phenomena. In one particular embodiment of this aspect, the dither signal is processed by a dither filter that has a transfer function chosen to compensate for plant phase and amplitude variations between low and high frequency inputs.

Other system compensation elements such as integrators, multipliers and low pass filters can be applied to the response of such a dither filter, to further refine the application of the compensated dither signal.

In a preferred embodiment of this aspect, the dither signals may be applied as a pair of orthogonal signals. For example, sine and cosine dither signals are generated at a given dither frequency for the respective x-axis and y-axis control inputs of an actuator.

In further aspects of the present invention, variable modulation amplitudes may be employed on the dither signals to maximize convergence speed. In particular, to speed up the controller convergence process, the dither signal amplitude is ramped by larger values at the start of the closed loop state. The dither amplitude is then ramped down towards the end of the closed loop state as convergence proceeds. This has the effect of not only allowing the system switching speed to increase, but also maximizes final optical output power.

The amplitude changes in the dither signal can be made in accordance with the change in amplitude as a function of a gradient along a parabola that models the optical coupling between input and output.

According to still further aspects of the invention, the controller may generate control signals that are compensated for a desired and selectable attenuation level of output optical power. In particular, when in the closed loop state, the controller achieves a certain prescribed loss which is typically set to be as low as possible, with the dither signals following a prescribed orbital path around some maxima of the gradient. However, by appropriate phasing and amplitude adjustment of the modulating signal applied to each of the actuators, the articulating element can be caused to trace out a 'lower power' orbit around an optimal position. By changing the dithering amplitudes in this manner, the system can therefore provide a variable optical attenuator function, without the use of additional components.

In summary, unlike other prior art control systems for optical switches, the present invention does not assume that a simple, algebraic (albeit non-linear) relationship exists between the application of input position control signals and the resulting outputs. Rather, with this invention, the physical plant is thought of as a dynamic system with phase delays, amplitude changes and other dynamic phenomena.

The invention thus accounts for internal system state variables, such as might result from an internal mechanical degree of freedom (such as fiber position) whose rate of change with time depends on both starting inputs signals as well as current position.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1A:
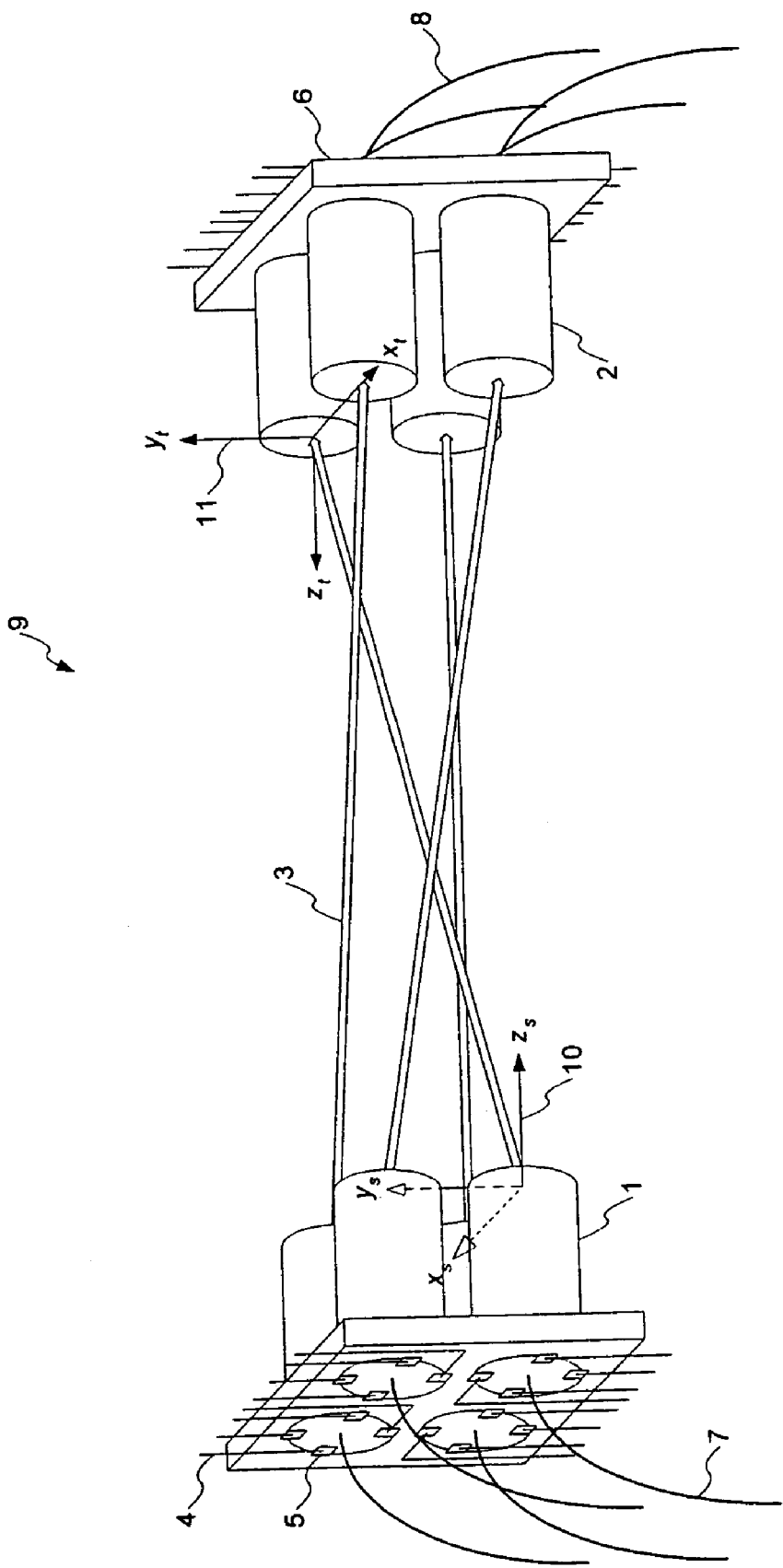
FIG. 1A is schematic diagram of one preferred embodiment of the invention.

FIG. 1A details a typical all-optical free-space cross-connect switch consisting of an optical fabric 9 that includes optical source port emitters 1 and optical target port receivers 2. The emitters 1 can be selectively connected to the receivers 2 by varying the direction of the collimated beam 3 so as to impinge on the selected receiver 2. This can be accomplished by directly controlling the horizontal and/or vertical tilt angle of one of the emitters 1 or receivers 2. In other embodiments, mechanical actuators may control the horizontal or vertical direction of one or more micro-mirrors that control the resulting beam 3 or its detection. Any combination of active and/or passive emitters and/or receivers can be combined to form 1×N, N×1, N×N or M×N switch assemblies. It should also be understood that the assembly isbidirectional, i.e., input ports 1 could be considered to be output ports 2 and vice versa. FIG. 1A also shows a typical placement of the electrical control leads 4, electrical contacts 5 and support hardware 6.

Figure 2:
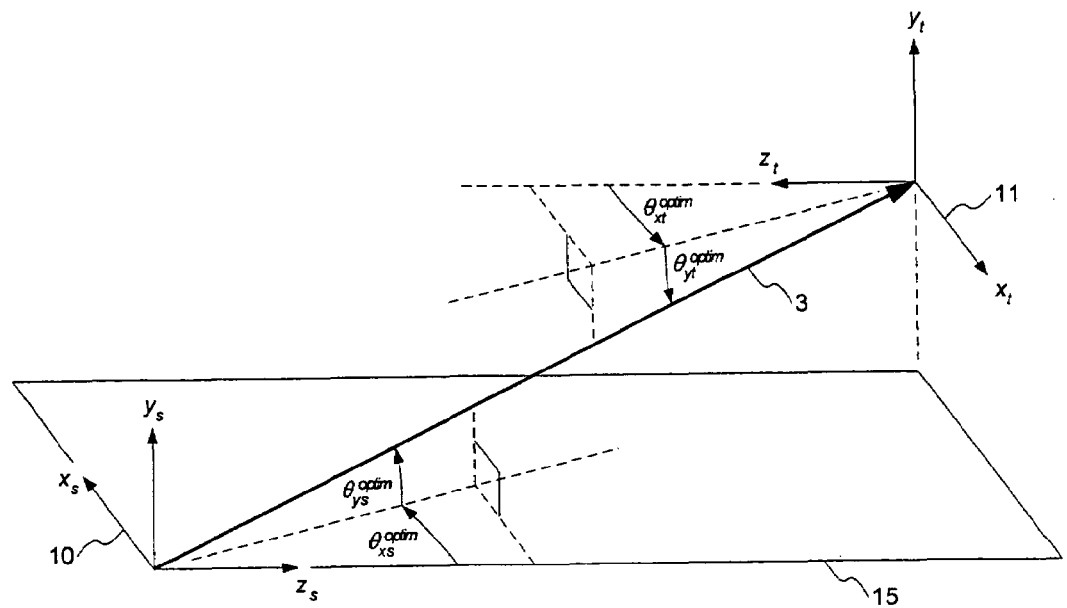
FIG. 2 is a plot of the three-dimensional coordinate axes describing optimal alignment of source and target ports.
Figure 3:
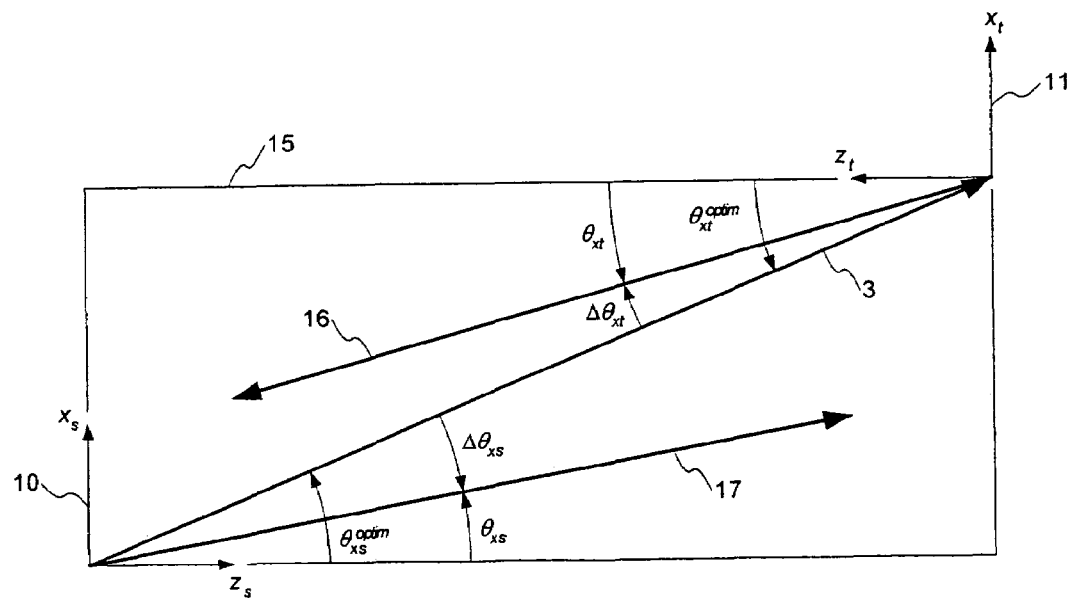
FIG. 3 is a two-dimensional projection onto the x-z plane comparing misalignment of source and target ports with the optimal alignment direction.

The basic function of the switch is to couple light from the input fibers 7 connected to the source ports and the output fibers 8 connected to the target ports. A pair of coordinate systems 10 and 11 define the connections between the source and target ports, respectively, used in FIGS. 2 and 3. FIG. 2 represents the three-dimensional (3D) coordinate systems used to define the optimal alignment angles between the source and target ports while FIG. 3 is the projection of FIG. 2 on the x-y plane, and is used to define angular alignment errors as more fully detailed below. The resulting vector 16 represents a deviation from the optimal pointing angle of the target 2, and vector 17 the deviation form the optimal pointing angle of the source 1.

Figure 1B:
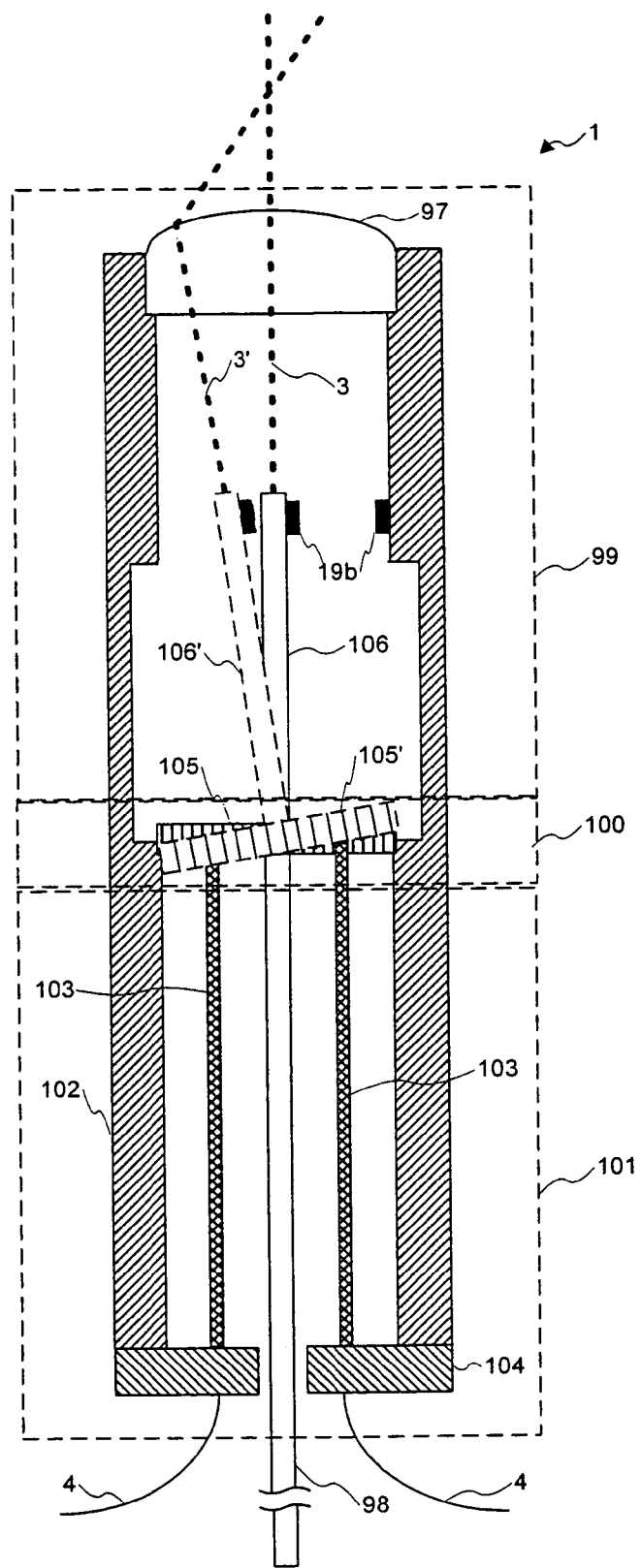
FIG. 1B is a mechanical diagram of a port providing control motion used in the embodiment of FIG. 1A.

FIG. 1B is a mechanical diagram of an individual port, for example a source port 1. This port can be assembled from layered subassemblies, such as an actuator subassembly 101, a motion transformer subassembly 100, and a lens/collimator subassembly 99.

The actuator sub-assembly 101 includes a base layer 104, actuators 103 and a spacer (housing) layer 102. The base layer 104 forms a support layer for the actuators 103. The actuators 103 may be piezoelectric, electrostrictive, thermal, or magnetostrictive in composition, or any other variety of other actuators known in the art. Typically, piezoelectric actuators provide a range of motion of about 10 microns for a given drive voltage.

The motion transformer subassembly 100 is the primary motion transformer that is used to convert linear motion, for example, of the actuators 103 into angular motion. The motion transformer subassembly 100, for example, a micro-machine (MEMS) silicone-on-insulator (SOI) wafer and can include a tiltable fiber holder 105 or other such structure that can be connected directly to etched mechanisms on other subassemblies 101 and 99. The tiltable fiber holder 105 holds a metalized portion 106 of a fiber 98 such that the metalized portion 106 tracks its angle. The motion transformer subassembly 100 converts vertical elongation/lateral bending motion of the actuators 103 into an angular tilt of the fiber 98 for controlling the beam trajectory, as represented by the tiltable fiber holder 105' and metalized portion 106' of the fiber 98.

The metalized portion 106 of the fiber 98 and a lens 97 in the source port 1 need to be carefully aligned so that a light beam 3 is collimated for optimizing the optical emitter-to-receiver coupling efficiency. In practice, this can be done by observing the wavefront of the device and locking the fiber 98 in place in the tiltable fiber holder 105 in the motion transformer subassembly 100 through use of ultra-violet settable epoxy, for example. Through proper attachment, the tiltable fiber holder 105 accurately tracks the angle of the tiltable fiber holder 105 such that the emitted light beam 3' is angularly incident on the lens 97, which causes it to be directed to a different receive port 2.

The actuators 103 are very stiff compared to the optical fiber 98 and mechanical amplifier of the motion transformer subassembly 100. The motion transformer subassembly 100 has a mechanical resonance of a few hundred Hertz (Hz) up to several kilohertz (kHz), depending on the design. Therefore, it is this motion transformer subassembly 100 that causes amplitude and phase lag characteristics as it tracks a command signal at high speeds, thereby exciting mechanical frequencies approaching the natural resonance frequency of components (i.e., flexures, not shown, and tiltable fiber holder 105 combination) in the motion transformer subassembly 100. It is these characteristics that can benefit from control by a dynamic compensator.

Figure 9:
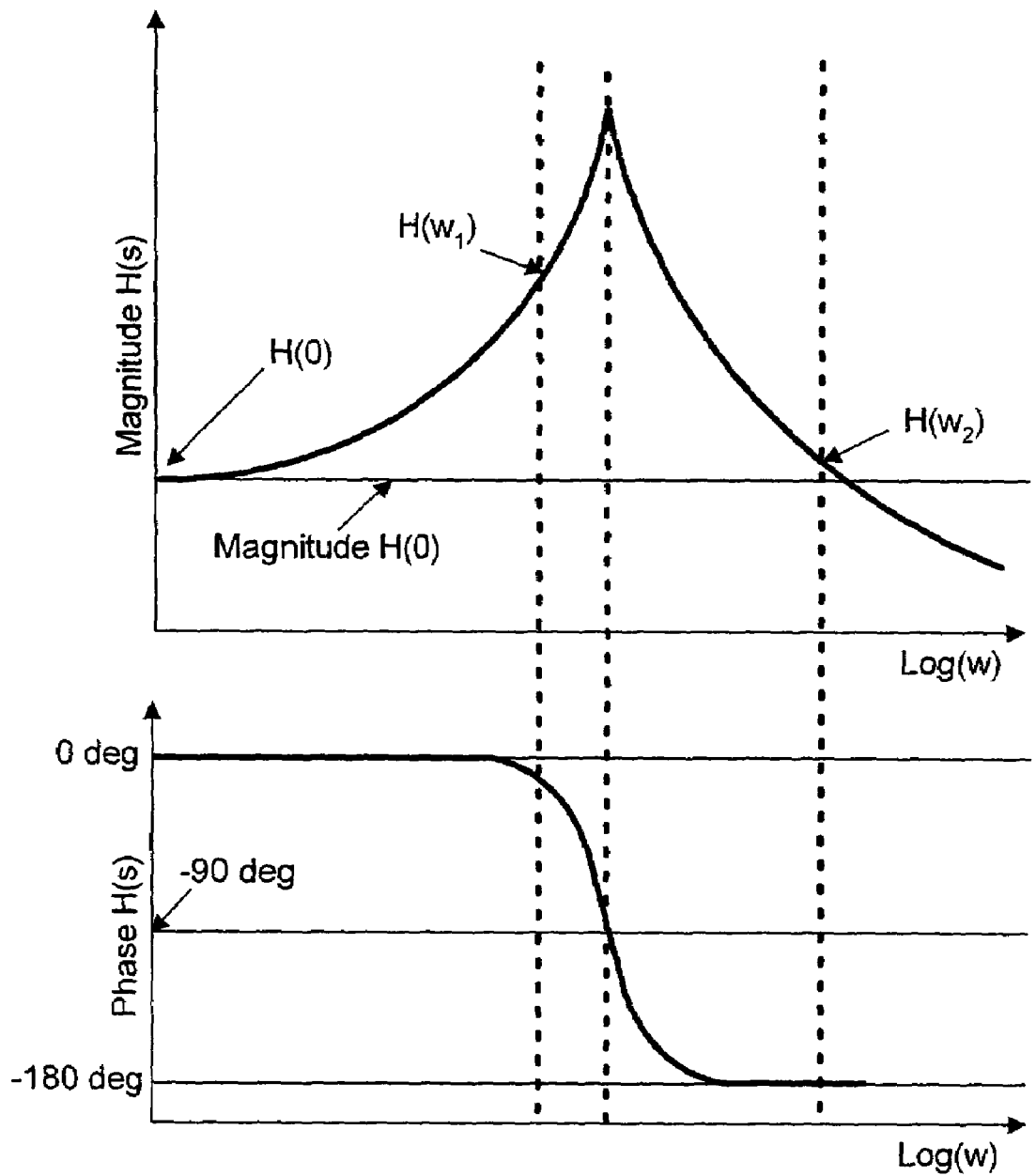
FIG. 9 is a bode plot of a transfer function of the port of FIG. 1B.

FIG. 9 is a bode plot of an open-loop frequency response transfer function, H(s), of the mechanical system of a source port 1 to receiver port 2 (i.e., plant), which includes the mechanical resonance of the motion transformer subassembly 100. This is a typical transfer function of a source port 1 to a receiver port 2, $H_{1,2}(s)$, or, more generally, $H_{i,j}(s)$.

H(0) is the static (i.e., DC or very low frequency) response of the system. $H(w_1)$ is a first point on the magnitude and phase curves. $H(w_2)$ is a second point on the magnitude and phase curves. Sinusoidal dither frequencies may be applied to the mechanical system at $H(w_1)$ or $H(w2)$, or a combination thereof, or any other frequency along the Bode plot curves.

As well understood in the field of control systems, at H(0) (i.e., DC), the system is very stable. At $H(w_1)$ and $H(w_2)$, the system experiences a phase lag, as indicated by the phase curve. At very low dither frequencies near H(0), the system does not require dynamic compensation because mechanical resonance is not approached and minimal phase lag is incurred; thus, the switching is effectively static. At high dither frequencies, such as $w_1$ and $w_2$, however, the dynamics of the motion transformer subassembly 100 cause tracking error, which are a limiting factor for the switching rate. As will discussed in more detail below, however, the teachings of the present invention provide dynamic compensation for the high dither frequencies $w_1$ and $w_2$ such that the system has the effective stability of operating near H(0) while allowing the switching to be very fast and remain stable. As will be discussed in more detail below, the frequencies $w_1$ and $w_2$ are preferably integer multiples for simplifying filters used to close a dynamic compensation loop around the mechanical system.

Figure 4:
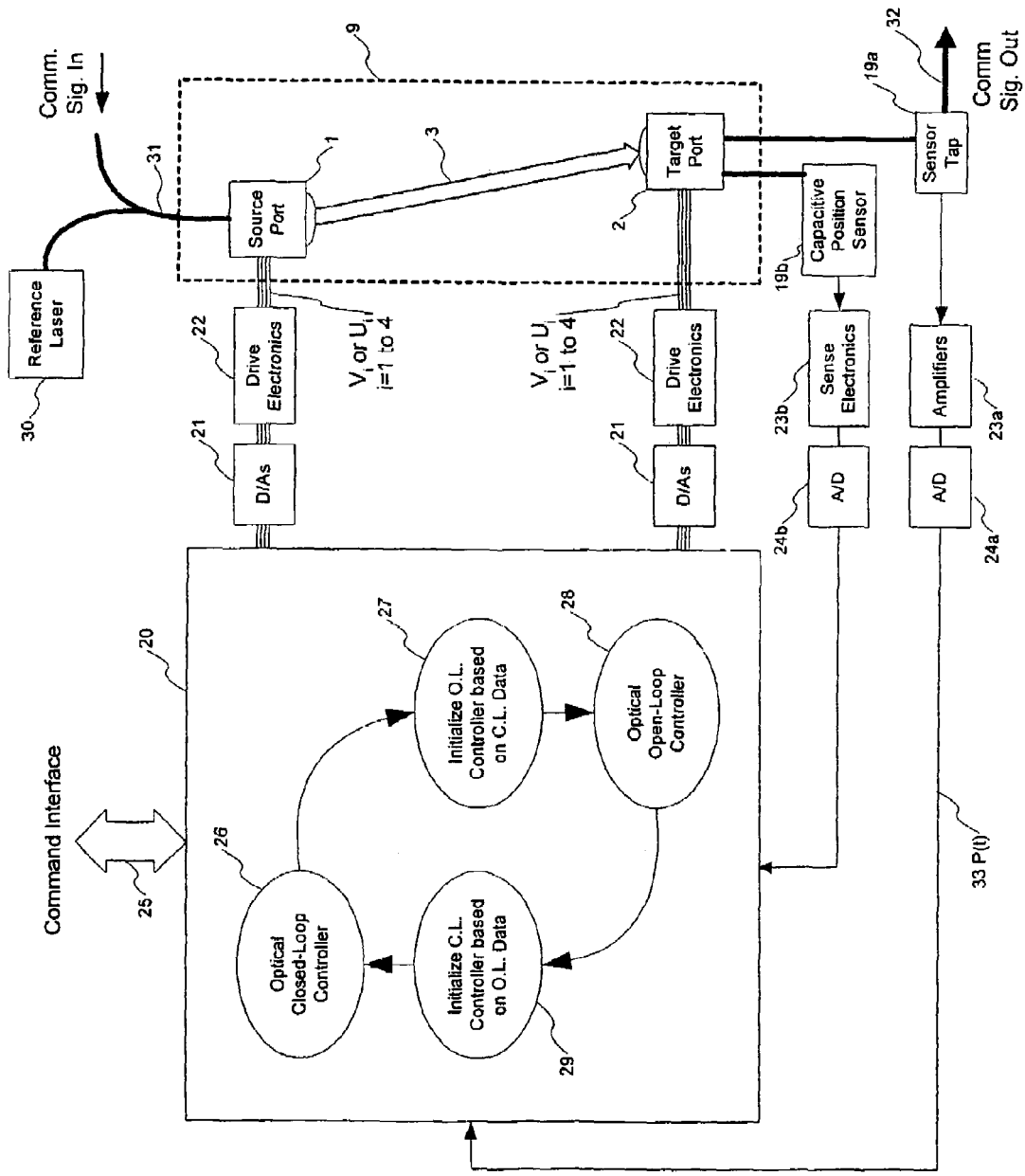
FIG. 4 is a block diagram illustrating the overall switch and control operation.

FIG. 4 shows elements of the control system in greater detail. An input communication signal is provided on source fiber 31. The fabric 9 steers the signal received at a source port 1 to a selected target port 2 via light path 3. A target fiber 32 provides an output optical signal back to the communication system.

A digital controller 20 controls the beam-steering elements in the ports 1, 2 of the switch fabric 9. The controller outputs are converted to analog signals using Digital-to-Analog (D/A) converters 21, which are connected to respective drive electronics 22 for each beam-steering element 105. The drive electronics 22 may incorporate, for example, high-voltage amplifiers (not shown) to produce the voltage and/or current required for the actuators 103 (FIG. 1B).

In steady state operation, the control loop is closed about the optical power measured at the target port 2. More particularly, as the controller 20 adjusts the pointing direction of the source ports 1 and target ports 2, the amount of optical power coupled into the target fiber 32 changes. The optical power is measured by a sensor 19a placed at the target fiber 32, to produce a proportional electrical signal. The sensor 19a may include an evanescently coupled in-line detector (not shown). Alternatively, a tap coupler (not shown) may be used to couple a small portion of the signal into a power sensor (not shown). The electrical signal output from the sensor 19a is amplified 23a prior to Analog-to-Digital (A/D) conversion 24a. To improve the signal-to-noise ratio and the dynamic range of the power measurement, multiple gain stages may be employed and selectively used by the amplifier 23a.

In an alternative embodiment, the capacitive position sensor 19b (FIG. 1B) may be employed to estimate the angular position of the optical path 3, and, by using a calibration table or other technique, an estimate of the coupled power can be determined. The sense electronics 23b and A/D converter 24b may be the same as described for use with the optical sensor 19a.

Assuming use with the optical detection embodiment, the digital controller 20 receives a feedback signal from the A/D converter 24a. The digital controller 20 then chooses a gain level that maximizes the signal-to-noise ratio without saturating the A/D converter 24a. In one embodiment, a reference laser 30 injects an out-of-band (i.e., other than 1550 nm, for example) signal into the source fiber 31 on the input side, which is measured by the optical sensor 19a at the output side. In this embodiment, the wavelength of the reference laser 30 is chosen to be sufficiently different from the communication signal to allow the use of a filter to separate the two signals at the output.

Alternatively, the reference laser 30 can be injected at the output side of the fabric 9 and allowed to travel through the switch in the opposite direction of the communication signal and be measured by a sensor (not shown) located at the input port 1. In yet another embodiment, no reference signal is injected into the fabric; rather, the communication signal is measured directly by the optical sensor 19a for optical closed-loop control. In still another embodiment, the system measures the signal at the input port 1 and output port 2 to determine a differential power, delta(P), directly. What is important to recognize here is that a number of different techniques may be used to develop a closed-loop control structure.

At a high level, the operation of the control system 20 includes a number of discrete states, as depicted in the simplified finite state machine (FSM) controller 20. Provisioning of a new connection is initiated when a command is received via the command interface 25.

During the transition, no optical signal will be available via the optical sensor 19a monitoring the target port 2. It is therefore not possible, nor is it desirable, to close the control loop around the optical power measurement alone. Instead, an optical open-loop controller 28 is first employed to point the source port 1 element towards its new target port 2. This task is non-trivial in view of the nonlinearities and hysteresis which may be present in the actuators. So, at the start of the transition, the open-loop controller is initialized 27 with available information about the current port state and may include looking up information from calibration tables.

It is important to ensure that both the source port 1 and target port 2 are steered towards each other accurately enough such that sufficient optical power can be measured at the optical sensor 19a when the open-loop transition is complete. This means enough power must be coupled to allow detection of a signal by the optical sensor 19a, which is slightly larger than the noise level at the maximum gain setting of the optical sensor 19a.

The internal state variables of the controller 20, such as the integrators (which are described in the next section), are initialized 29 using values of the corresponding control variables from the end of the open loop transition 28. The optical closed-loop controller 26 then takes over in the steady state to minimize the insertion loss.

Port Control

Normal operation

Figure 5:
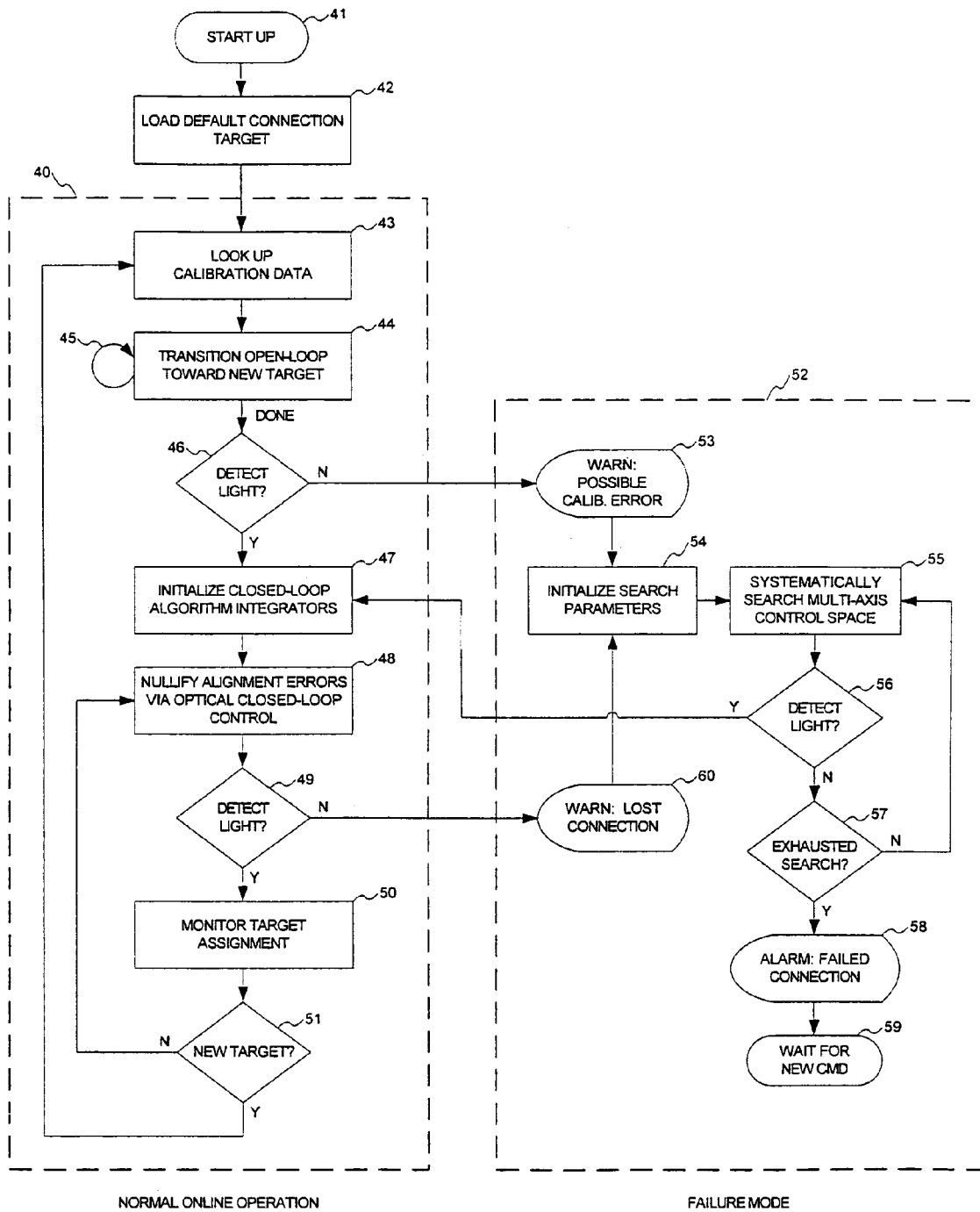
FIG. 5 is the process flow of the port controller.

The port controller 20 operation is described now in more detail with reference to FIG. 5.

During system start up state 41, before any switch commands are received from the host, an index value is used to identify a default connection target port for each source port is loaded 42, such as may be stored in a non-volatile memory. Calibration data for the control signals, e.g. in the form of absolute voltages or differential charges previously determined appropriate for steering the given source port to the selected target port, are then loaded 43. These values are used to initialize what is referred to here as the open-loop switch transition 44. Switching commences within this open-loop transition state 44 allowing the port control signals, e.g. the voltages or charges, to "ramp up" toward the loaded calibration values. Ramping of the port control signals continues 45 until the calibration values are reached, e.g. in a pre-specified period of time.

Under normal operation 40, namely when all hardware is functioning properly and communication laser light has been coupled into the switch source fiber 31, the open-loop transition is intended to steer the source port 1 close enough toward its target port 2, and vice versa, so that some predetermined minimum amount of output light power is detected by sensor 19. It is the duty of the following optical closed-loop control algorithm to nullify any residual alignment errors following the open-loop transition such as those resulting from hysteretic and time- and temperature-dependent inaccuracies of the calibration data. Therefore, upon detection of output light power 46 following the open-loop transition state 44, the port controller is placed into an optical closed-loop control state 48, starting with initialization of the closed-loop algorithm integrators 47 to the values of the port control inputs at the end of the open-loop transition. By design, the free-space light-power coupling between the source port 1 and its target 2 is maximized by the action of the optical closed-loop control algorithm as alignment errors are nullified. The details of this operation, which takes into account the dynamic nature of the actuators, are described in a following section. To account for continued time and temperature dependent changes in the system, the optical closed-loop control state is maintained until a new target assignment is commanded by the network management system via the interface 25.

While under optical closed-loop control, the port controller continually monitors the host for the most up-to-date target assignment 50. As long as the target assignment remains unchanged 51, the port controller continues in the state of optical closed-loop control to ensure that maximum light-power coupling is retained in the presence of physical disturbances and time- and temperature-dependent system changes. However, if a new target is assigned in state 51, i.e. a switch to a new target has been commanded by the host, the port controller 20 restarts the complete sequence, back at the open-loop state at the point of looking up the appropriate calibration data 43 for the new target. From there, the port controller repeats as described above.

Failure mode

For any number of reasons, light coupling may be lost or not achieved during normal operation, at which point optical closed-loop control can no longer be employed to nullify alignment errors. In the event that light is not detected 46 after the open-loop transition 44, it is first assumed that the open-loop transition calibration values loaded during state 43 are no longer sufficient due to time-dependent changes in the system kinematics. Accordingly, a warning message is returned to the host at state 53, relaying a possible calibration error. On the other hand, if light detection 49 ceases during optical closed-loop control 48, a warning message is returned 60 stating that the connection has been lost. Possible causes could include, but are not limited to, an interruption in the communication light path or a jarring disturbance of the switch fabric. If and when any such failure to detect light occurs for a duration exceeding a pre-specified length, the port controller is diverted from its normal mode of operation 40 into a failure mode 52.

The first priority in this failure mode is to attempt to reestablish light coupling by placing the port controller into a search pattern. Specifically, search parameters are initialized 54, and a search commences 55 by steering the port systematically or randomly and exhaustively throughout its multi-axis (x,y) control space. If the search is successful in reestablishing light coupling, i.e. in detecting light 56, the port controller is returned to the normal mode of operation 40 at the point of initializing optical closed-loop control 47. However, if the search terminates 57 upon having scanned exhaustively the multi-axis control space without having detected light, an alarm is raised 58 to notify the host of a failed connection, and the port controller is put into a hold state 59 while waiting for a new command from the host.

Multi-Axis Closed-Loop Control

Figure 6:
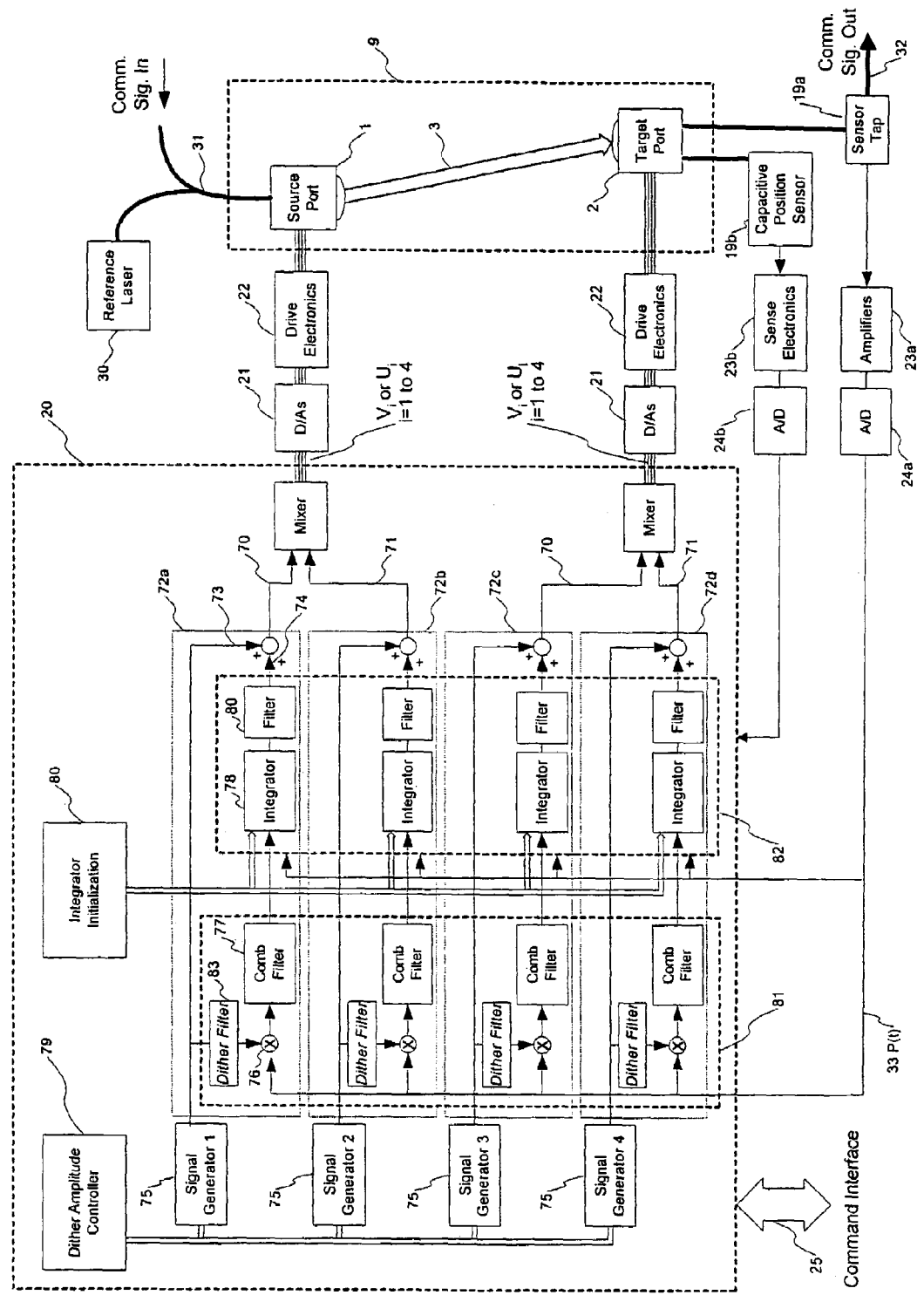
FIG. 6 is a block diagram illustrating operation of the closed-loop controller.

The operation of the controller in this closed-loop state is now described in more detail with reference to FIG. 6.

Plant Description

The first step is to describe the physical plant, which is represented as a dynamic system that responds to the control inputs($u_i$) 70, 71 provided by the controller 20 and whose output is the signal proportional to an output optical power signal 33. Alternately, demarcation for the physical plant can be taken from the input voltages ($V_i$) to the optical power signal 33 since the input control voltages, $V_i$, are taken to be simple algebraic functions of the control inputs, $u_i$. This system encompasses electrical, mechanical and optical functions.

This system reacts to the time histories of the control inputs generally as a nonlinear dynamic system with internal states, such as fiber tip position or other mechanical degrees of freedom whose rates of change depend on the input values, and potentially time histories of the internal states and control inputs. The system can also respond to external disturbances which act to misalign the elements and cause perturbation to the optical loss through the switch. A key function of the controller 20 is thus to control against these disturbances and maintain a stable optical output power at a desired value, even in the presence of such external disturbances.

It is important to understand that the system does not necessarily respond to the input signals instantaneously as would be the case if there were no system internal dynamics. In the case of no or negligible internal dynamics, there is a simple algebraic (nonlinear) relationship between the inputs and outputs. Rather, in this invention the plant is thought of as a dynamic system with phase delays, amplitude changes and other phenomena associated with dynamic system response as are known in the art. Principal among these concepts is the idea of an internal system state variable, such as an internal mechanical degree-of-freedom like fiber position, whose rate of change with time depends on both system inputs as well as other system states. A key element of this invention is a method and system for control which compensates for this dynamic nature of the controlled plant, accounting for phase delays, resonant response, modal behavior and the other phenomena associate with dynamic mechanical and optical systems.

A representation of some of the dynamic phenomena associated with the plant is shown in FIG. 9. This figure is a bode plot of a representative transfer function, H(s), for the system. The concept of a transfer function from input to output for a dynamic system or a linearized nonlinear dynamic system is well known in the art. It could, for instance, represent the frequency response of the physical plant (optical power signal) to small perturbation signals applied to the control input(s).

In general, since the plant is a nonlinear system, H(s) is actually H(u, x, s), i.e. it not only depends its internal behavior but also upon state variables, x, and control inputs, u. (This configurational dependence is assumed in all notation below, even if it is not explicitly present in the mathematics). The transfer function represents the linearized system response to small signals when the plant is in a given configuration, as for instance, for small signal sinusoidal perturbations about a mean control input. Strictly speaking, it represents the Laplace transform of the Green's function for the system relating input signals to output response. In interpretation, it can be thought of as the relative magnitude and phase of a sinusoidal response of the system to a sinusoidal input of the system.

In FIG. 9 there are several regimes evident. If the system input is slowly changing (s is small), then the system output responds in phase (or 180 degrees out of phase) with the input at some gain level, H(0). The transfer function quasi-static or low frequency response is found as s=iω approaches 0, i.e. as ω approaches 0. As the input signal increases in frequency to say, ω1, the output response amplitude and phasing change relative to the input sinusoidal signal. This effect is especially pronounced in the vicinity of any system modal response or resonance due to, for instance a dynamic resonance in the beam steering units or housings. These dynamic effects must be taken into account for effective system control if any input signals have frequency content in a frequency range where the system response is significantly different from the quasi static response in the region around H(s)=H(0).

In general, for fast switch time (time of transition from locking condition on one output port to another), the input control signal must vary rapidly or have frequency content, such as high frequency dithers, which have sufficiently high frequency content to necessitate the consideration and accounting for dynamic effects in the controlled plant. Explicit compensation of these effects can be critically important for fast switch time and rapid convergence of the system controller to the optimizing values for highest optical power through the switched optical link.

The physical plant will now be described mathematically as an aid to understanding how the controller works.

Source or Target Port, 1 or 2: The source and target ports respond indirectly to control inputs, u, and directly to the applied voltages at the ports by adjusting the beam pointing angles or virtual beam pointing angles for the target port. The optical power coupled from the source to target port can be thought of as at least partially dependent on the beam angles and therefore as a function of the control inputs. The beam pointing angles for each port are functions of the voltage applied to the actuators for the corresponding beam-steering device. In general, each port is itself a dynamic nonlinear system as described above with inputs being the voltages and outputs being the output angles, $\theta_{xs}$ and $\theta_{ys}$, for the source, or the beam angles for the virtual beam path of the target port, $\theta_{xt}$, and $\theta_{yt}$.

In general, for a given port the relationship between input voltages and output angles is highly nonlinear and history dependent because of mechanical non-linearities in the mechanisms, geometric non-linearities in the optical path, and hysteretic and nonlinear behavior in the actuator materials. It exhibits dynamic behaviors as described above because of dynamic responses of its mechanical components, phase lags in the piezoelectric material response, inertias of its moving elements, and any of a number of dynamic behaviors known in the art for controlled opto-mechanical systems.

In the present embodiment, the inputs to the port are the electrical voltages $V_1$–$V_4$ which are applied to the electrodes of the actuating element, while the outputs are the beam angles $\theta_x$ and $\theta_y$. In the specific embodiment of the above example, each beam-steering element has four independent electrodes, however other actuation mechanisms with different number of electrodes are easily accommodated. In general:

$$\theta(t) = \begin{bmatrix} \theta_x \\ \theta_y \end{bmatrix} = G(V(t), \alpha, t) \quad (1)$$

where, V(t) is the vector of input voltages to a port, α is a vector of system parameters, and t is time.

The drive voltages can be related to the command signals, $u_x$ and $u_y$, for a given port through a simple mixing law. The mixing law can be as simple as:

$$V = \begin{bmatrix} V_1 \\ V_2 \\ V_3 \\ V_4 \end{bmatrix} = Mu + V_{bias} = \begin{bmatrix} 1 & 0 \\ 0 & 1 \\ -1 & 0 \\ 0 & -1 \end{bmatrix} \begin{bmatrix} u_x \\ u_y \end{bmatrix} + \begin{bmatrix} V_{1bias} \\ V_{2bias} \\ V_{3bias} \\ V_{4bias} \end{bmatrix} \quad (2)$$

The bias voltages are used to accommodate uni-polar actuators—for bi-polar actuators the bias terms may be set to zero. The bias voltages can be one of many system parameters, α, in Eq. (1). More complex, piecewise or nonlinear mixing laws may also be employed. Combining the above elements (ignoring the bias terms), the port system can be represented as:

$$\theta(t) = \begin{bmatrix} \theta_x \\ \theta_y \end{bmatrix} = L(u(t), \alpha, t) \quad (3)$$

where u is the vector formed of control inputs and L represents a nonlinear, potentially time varying dynamic operator representing the dynamic mapping of function u(t) to θ(t). By choosing an appropriate mixing function, M, the design engineer may be able to simplify dependencies between the control inputs and the output angles. For instance, a given output angle may be made to be predominantly influenced by only one control input, say $u_x$. This decoupling and diagonalizing of the system can help in reducing computational complexity in the resulting controller. It may be possible to decouple the relationships for quasi-static response but not for control inputs with high frequency content.

It is important to note that the relationship between the control variables and beam angles is generally nonlinear due to the response of the actuator as well as other nonlinear mechanical and optical effects. It is therefore helpful to think of a linearization of the nonlinear response about an operating point. The drive signal for each actuator can be broken up into a nominal component, $\bar{u}$, and a smaller perturbation, δu, as in:

$$u = \bar{u} + \delta u \quad (4)$$

In the present system, $\bar{u}$ 74, is a more slowly varying mean control signal which is computed by a mean level controller, 82, and δu 73 is a more rapidly varying open loop oscillatory perturbation, called a dither signal, which is added onto the mean value to produce the total control signal 70. The dither signals for each of the four control signals is produced by a respective one of four signal generators 75 and typically consists of a sine or cosine signal of small controlled amplitude at a predetermined frequency or set of frequencies. The amplitude of the dither signal is controlled by a Dither Amplitude Controller 79 which can adjust the dither amplitude responding to system information, to for instance achieve faster convergence to the optical control values or to minimize higher order, or nonlinear effects in the system. The function of the dither amplitude controller will be discussed in more detail in a later section.

In general it is desirable that the dither signal be mutually orthogonal with respect to some time averaging operator. Some good selections are a sine and a cosine with one frequency at the source and one frequency for the target port. Alternately, each dither can oscillate at a different chosen frequency, with the frequencies chosen such that the time average of the product of any two different dither signals is zero when averaged over a chosen averaging period, T. Examples are $\sin(t)$ and $\sin(2t)$ averaged over a period, $T=2\pi$. Orthogonality of the dither basis functions is important for distinguishing between the effects of the various dithers on the single perturbed power signal as will be described below.

Applying standard linearization techniques, we can express the source or target port system equations as:

$$\theta(t)=\bar{\theta}+\delta\theta=\bar{L}(\bar{u}(t),\alpha,t)+\tilde{L}(\delta u,\bar{u}(t),\alpha,t)+\text{higher order terms (HOT)} \quad (5)$$

where the nominal angle, $\bar{\theta}$, is a function of the nominal drive signals, and the varying component, $\delta\theta$, is the perturbation from the nominal angles resulting from the perturbation in the input controls due to the dither inputs, $\bar{L}$ is a nonlinear dynamic operator acting on the nominal control inputs and $\tilde{L}$ is a dynamic operator which is linear in $\delta u$ (though not $\alpha$ or $\bar{u}$). Since $\tilde{L}$ is linear in $\delta u$ for small perturbations, taking the Laplace transforms of the perturbed responses we have:

$$\delta\theta(s) \approx \tilde{L}(s,\bar{u}(t),\alpha)\delta u(s) \equiv \tilde{L}(s)\delta u(s) \quad (6)$$

where $\tilde{L}(s)$ is the transfer function for the linearized system, and $\delta\theta(s)$ and $\delta u(s)$ are the Laplace transforms of the perturbed angle and perturbed control respectively. The transfer function for each beam-steering element can be characterized experimentally prior to operation of the device for a number of different nominal control inputs and configuration parameter values. This can involve applying a small oscillatory signal to the control inputs and measuring the resulting small beam angle changes using any of a number of optical tools such as an x-y sensor. This can be done for each configuration and for each mean control signal. It can be characterized at a few important frequencies such as a low frequency at s=o and at specific higher frequencies corresponding to dither inputs as described below. The resulting measured information can be stored in system memory and used for compensation for the system dynamics, as explained below. The closed-loop controller will typically use the value of the transfer function at a number of specific modulation frequencies to compensate for system dynamics.

Optical Power

The insertion loss of the switch is in part a function of the angular pointing errors of the source and target ports. In general, it is a function of many optical parameters in the system such as splice accuracy, optical element coating behaviors, the transmisive properties of any interspersed media between the ports, etc. For the purposes of exposition here we only consider the dependency of power on beam angles. This should not be taken as limiting but only clarifying for the discussion.

FIGS. 2 and 3 illustrate the coordinate systems necessary to define these angular pointing errors. In FIG. 2, the optimal beam path 3 is shown connecting the origins of the Cartesian coordinate systems 10 and 11 of the source 1 and target ports 2, respectively. The beam angles of this optimal path are defined relative to the coordinate systems by $\theta_{xs}^{optim}$ and $\theta_{ys}^{optim}$ for the source port 1 and $\theta_{xt}^{optim}$ and $\theta_{yt}^{optim}$ for the target port 2.

To better illustrate the actual beam angles and their angular pointing errors due to misalignment relative to the optimal beam path, FIG. 3 depicts a planar projection of the coordinate systems onto the x-z plane 15. Though not shown, angles in the y-z plane are analogous to those shown in FIG. 3. Again relative to coordinate systems 10 and 11, the beam angles for the actual beam path 16 of the source port are given by $\theta_{xs}$ and $\theta_{ys}$, and the beam angles for the virtual beam path 17 of the target port are given by $\theta_{xt}$ and $\theta_{yt}$. The angular pointing errors, $\Delta\theta_{xs}, \Delta\theta_{ys}, \Delta\theta_{xt}$, and $\Delta\theta_{yt}$, are defined as the deviations of the source beam angles and the target beam angles from the optimal values according to $$\Delta\theta = \theta - \theta^{optim}$$

Naturally, optical power coupling is maximized when the actual and virtual beam paths are coincident with the optimal beam path, i.e. when all $\Delta\theta=0$. However, when alignment errors do exist, the insertion loss power relationship can be represented roughly by a Gaussian of the form:

$$P = P_0 e^{-a_1\Delta\theta_{xs}^2} e^{-a_2\Delta\theta_{ys}^2} e^{-a_3\Delta\theta_{xt}^2} e^{-a_4\Delta\theta_{yt}^2} \quad (7)$$

The coefficients $a_1$–$a_4$ represent the sensitivity of the insertion loss to pointing errors in the different directions and are typically roughly equal. The Gaussian relation can be converted to a quadratic relation simply by taking the log of the previous equation:

$$\log P = \log P_0 - a_1\Delta\theta_{xs}^2 - a_2\Delta\theta_{ys}^2 - a_3\Delta\theta_{xt}^2 - a_4\Delta\theta_{yt}^2 \quad (8)$$

The expression can be linearized about the operating point using the equation:

$$\Delta\theta = \theta - \theta^{optim} = \bar{\theta} + \delta\theta - \theta^{optim} = \Delta\bar{\theta} + \delta\theta$$

$$\log P = \log P_0 - a_1\Delta\bar{\theta}_{xs}^2 - a_2\Delta\bar{\theta}_{ys}^2 - a_3\Delta\bar{\theta}_{xt}^2 - a_4\Delta\bar{\theta}_{yt}^2 - 2a_1\Delta\bar{\theta}_{xs}\delta\theta_{xs} -$$
$$2a_2\Delta\bar{\theta}_{ys}\delta\theta_{ys} - 2a_3\Delta\bar{\theta}_{xt}\delta\theta_{xt} - 2a_4\Delta\bar{\theta}_{yt}\delta\theta_{yt} +$$
$$\text{higher order terms}$$
$$\approx \log\bar{P} - 2a_1\Delta\bar{\theta}_{xs}\delta\theta_{xs} - 2a_2\Delta\bar{\theta}_{ys}\delta\theta_{ys} -$$
$$2a_3\Delta\bar{\theta}_{xt}\delta\theta_{xt} - 2a_4\Delta\bar{\theta}_{yt}\delta\theta_{yt}$$

The above disposition has several assumptions with regard to coupling and power functional dependencies with angle. These assumptions are not intended to be limiting, but only serve to highlight some of the possible dependencies between angle and power. In particular, the optical axes do not have to align with the $\theta$ axes and there could be substantially more coupling between terms in the previous equations.

In general, since the optical power is a highly nonlinear function of the beam angles, for each port and $\Theta$, and because the beam angles are themselves functions of the control inputs, we have:

$$P(t) = H(u(t),\alpha,t) \quad (9)$$

where P(t) is, in the most narrow sense, the optical power coupled into the output waveguide associated with a given target port. For the purposes of the rest of this description, P(t) will generally stand for a signal which is some function of the actual power, for instance algebraically related to the optical power in the output fiber. It could for instance represent the log of the optical power as in Eq. (8). It could represent a constants gain times the actual power. These functions can be performed by the sensor tap 19a and amplifier 23a functions. The optical power signal P(t) 33 could also be taken as the difference between the input power in the waveguide for the source port and the output power in a waveguide associated with the target port. This could be the case when an optional input optical power detector is included in the system along with the output detector present in the sensor tap. This configuration of the system would be advantageous because then the absolute power loss through the optical switch could be measured directly by subtracting the source and target powers. Although it will be called the power signal P(t) 33, it will be taken to be a signal related to the optical power coupled from source to target. We can generally write:

$$P(t) = \overline{P} + \delta P = \overline{H}(\overline{u}(t), \alpha, t) + \tilde{H}(\delta u, \tilde{u}(t), \alpha, t) + \text{higher order terms} \quad (10)$$

where the nominal power signal, $\overline{P}$, is a function of the nominal drive signals and possibly system parameters, the varying component, $\delta P$, is the perturbation from the nominal power signal resulting from the perturbation in the inputs due to the dither inputs, $\overline{H}$ is a nonlinear dynamic operator acting on the nominal control inputs, and $\tilde{H}$ is a dynamic operator which is linear in $\delta u$ (though not $\alpha$ or $\overline{u}$). Since $\tilde{H}$ is linear in $\delta u$ for small perturbations, taking the Laplace transforms of the perturbed responses we have:

$$\delta P(s) \cong \tilde{H}(s, \overline{u}(t), \alpha) \delta u(s) \equiv \quad (11)$$

$$\tilde{H}(s)\delta u(s) = [H_1(s) \; H_2(s) \; H_3(s) \; H_4(s)] \begin{Bmatrix} \delta u_1(s) \\ \delta u_2(s) \\ \delta u_3(s) \\ \delta u_4(s) \end{Bmatrix}$$

where each of the $H_i(s)$ represents a transfer function from the perturbation due to the dither signal, $\delta u_i$, to the perturbation in the power signal; $\delta P(s)$ represents the Laplace transform of the perturbation in the power signal, and $\delta u_i(s)$ represents the Laplace transform of the perturbation in the control signal which can be caused by the added dithers. The $H_i(s)$ are representative of dynamic systems linearized about some nominal control inputs and parameters of the system and therefore are themselves functions of these inputs and parameters although for simplicity the notation has been dropped.

These transfer functions have the characteristics described previously for dynamic systems in FIG. 9. They have a regime of lower frequencies where they are well represented by the quasi static behavior of the system, H(0), and generally demonstrate the dynamic behaviors at higher frequencies, for instance $s = i\omega_1$, where the output exhibits magnitude and phase changes relative to the input. For small perturbation signals, the $H_i(s)$ can be thought of as frequency dependent gradients of the power with respect to the control inputs. At low frequencies, the gradient of the power with respect to the slowly changing control input is $$\left. \frac{\delta P}{\delta u_i} \cong H_i(s) \right|_{s \to o} \quad (12)$$

For higher frequency inputs, such as the sinusoidal dither signals at say, $\omega_i$, the perturbed power signal response is, strictly speaking, another sinusoid phase shifted and amplified by the angle and phase of the transfer function at that frequency. This is accurate for sufficiently small perturbations amplitudes such that the higher order terms in Eq. 10 are negligible. The importance and technique for compensating for these dynamic response issues will be discussed in the next section.

Controller Function

The power signal P(t) 33 roughly proportional to output power or power coupled through the switch is maximized (minimized for loss metrics) when every control variable is equal to its respective optimal value. However since the optimal values are not known a priori, a closed-loop control system is needed to achieve this. It is the function of the closed-loop controller 20 to command $u_x$, and $u_y$ for each port so as to maximize the output optical power.

Referring again to FIG. 6, in order to optimize the power and achieve the lowest insertion loss of a connection, both the input source port 1 and output target port 2 are controlled simultaneously. Each port has two control inputs, u (70 and 71), for steering the beam in two preferentially orthogonal directions ($\Theta_x$ and $\Theta_y$). Each of these four control signals is in turn produced by a respective one of the axis controllers, 72a–72d.

Gradient Estimator

The items within the block labeled 81 constitute the Gradient Estimator. The inputs into this block are the signal proportional to power 33 and the four dither signals generated by the dither generators 75. The outputs of block 81 are the estimates of the four partial derivatives of the power signal, P(t), with respect to perturbations in the nominal control inputs. These gradients of the power with respect to the nominal control inputs are then used by the Nominal Controller 82 to calculate the nominal controls, $\overline{u}(t)$. By using an estimated gradient, the Nominal Controller 82 can determine the necessary change in the nominal control signal, $\overline{u}$, to maximize the optical power. When the nominal component of the control signal is optimized, the $\Delta \overline{\theta}$ for the corresponding axis will be zero. The Nominal Controller 82 will be discussed in detail in a later section.

To estimate the coefficients, the dither signals, $\delta u$, are added to the nominal control inputs for both axes (x, y) of each of the source port 1 and target port 2. The dither signals are selected to be functionally orthogonal to one another. The power signal, as detected at 19, (or a signal related to the output power and possibly the input power as described above) will then consist of the response to the mean, $\overline{P}$, as well as a perturbed response, $\delta P$, due to the dithers, $\delta u$, as in Eq. (10) and represented schematically in FIG. 7:

$$P(t) = \overline{P} + \delta P = \overline{H}(\overline{u}(t), \alpha, t) + \tilde{H}(\delta u, \overline{u}(t), \alpha, t) + \text{higher order terms} \quad (13)$$

In a preferred embodiment, the dither signals 75 for the source port 1 can be a cosine and sine dithering signals on the x- and y-axes. The dither signals for the other port (e.g. the target 2) is driven with cosine and sine signals at a different frequency. These signal sets are but one example of orthogonal dither signals and others are possible, such as sine functions at even multiples of a specific base frequency. The intent is to create an orthogonal basis set of dithering functions, where the orthogonality allows the determination of the portion of the perturbed power signal, $\delta P(t)$, which is proportional to a particular dither input. So, $$\delta u(t) = \begin{bmatrix} d_1 \sin(\omega_1 t) \\ d_2 \cos(\omega_1 t) \\ d_3 \sin(\omega_2 t) \\ d_4 \cos(\omega_2 t) \end{bmatrix} \text{ or } \begin{bmatrix} d_1 \sin(\omega_1 t) \\ d_2 \sin(\omega_1 t) \\ d_3 \sin(\omega_3 t) \\ d_4 \sin(\omega_4 t) \end{bmatrix} \quad (14)$$

where $d_i$ represents the amplitude of the ith dither signal. Preferably $\omega_2 = 2\omega_1$ and likewise $\omega_3 = 2\omega_2$ and $\omega_4 = 2\omega_3$ such that integration over a single cycle of the slowest signal will establish the orthogonality between the signals. The dither signals can have amplitudes, $d_1$–$d_4$ determined by the dither amplitude controller, 79.

The gradient estimation process (taken for simplicity at a single port controller) consists of multiplying 76 the power signal 33 by the modulation signal 73, for that port adjusted for the system dynamics by the Dither Filter 83. To begin, consider the case where the dithers are at sufficiently low frequency that the dynamic nature of the plant can be ignored. As given by Eq. 11, in this regime the response is similar to the quasi-static response of the system, H(0) shown in FIG. 9 and there is very little phase delay between the input signal and the perturbed power output. Thus there is no phase lag (only a gain) between the dither inputs and the perturbed power response. In this case the power signal can be represented (assuming the sine and cosine dithers):

$$P(t) = \overline{P} + \delta P = \overline{P}(t) + \delta P_1 \sin(\omega_1 t) + \delta P_2 \cos(\omega_2 t) + \delta P_3 \sin(\omega_2 t) + \delta P_4 \cos(\omega_2 t) + HOT \quad (15)$$

Take for now the dither amplitudes to be unity and the Dither Filter 83 to have unity gain. Multiplying 76 the power signal by the particular dither signal one obtains (for the first dither):

$$P(t)\sin(\omega_1 t) = \overline{P}(t)\sin(\omega_1 t) + \quad (16)$$

$$[\delta P_1 \; \delta P_2 \; \delta P_3 \; \delta P_4] \begin{bmatrix} \sin(\omega_1 t) \\ \cos(\omega_1 t) \\ \sin(\omega_2 t) \\ \cos(\omega_2 t) \end{bmatrix} \sin(\omega_1 t) +$$

$$HOT * \sin(\omega_1 t)$$

Likewise there are three other product signals for the three other dithers. These signals consist of oscillating components at the dither frequencies and harmonics thereof as well as signals which have a DC component. If one considers the time average of Eq. 10 over a period of the slowest dither, $T = \pi/\omega_1$ one obtains:

$$\int_T P(t)\sin(\omega_1 t)\,dt = \int_T \overline{P}(t)\sin(\omega_1 t)\,dt + \frac{\delta P_1}{2} + \quad (17)$$

$$\int_T HOT * \sin(\omega_1 t)\,dt \cong \frac{\delta P_1}{2}$$

Thus, the time averaged product of the dither and the power signal is proportional to the gradient of the power with respect to that control input (in this case of unity amplitude low frequency dither). To achieve this averaging, the product signal is passed through a low-pass filter 77 to attenuate and filter out harmonics and retain only the DC or average component. Preferably, the process can employ a digital filter such as a Comb filter or Cascaded Integrator-Comb (CIC) filter where the notches in the filters are set to the dither frequencies and their multiples, to filter out the oscillatory content of the signal, passing only the low frequency DC component of the signal which is proportional to the gradient. Notice for this to be true, the nominal component of the power signal, $\overline{P}$, must vary slowly over time as compared to the dither signals so that the first term on the right in Eq. (17) will average to zero.

To account for the dither amplitude and the factor of two dividing $\delta P_1$ in Eq. (17), the Dither Filter can be set to a constant gain=$2/d_i^2$. In this case the averaged product signal becomes:

$$\int_T P(t) d_1 \sin(\omega_1 t) \left( \frac{2}{d_1^2} \right) dt \cong \frac{\delta P_1}{d_1} = \frac{\delta P_1}{\delta u_1} \quad (18)$$

which is the gradient of the power with respect to the first control input. Similar expressions can be determined for the other three control inputs (y-axis source, and x- and y-axis for the target).

The previous equations applied in the case where the dither frequencies were low enough that system dynamics were negligible and the power signal responds in phase (or exactly out of phase) with the dither inputs. In this case, the gradients determined by the gradient estimator are in fact also the gradients of the power with respect to the nominal control inputs.

Let us now consider the case where the dither inputs are at a frequency high enough that system dynamic effects start to become important. In general the system dynamics will alter the phase and amplitude of power response, $\delta P$, away from the response produced by low frequency dithers. Low frequency dithering produced measures of the system gradients that are equal to the gradients with respect to the nominal inputs. Since the perturbed power signals are very different with high frequency dithering, i.e., without dynamic compensation, the gradient estimator would not accurately estimate the gradient of power with respect to the low frequency nominal inputs. In other words because of the dynamic system effects, the gradients measured though high frequency dithering would be different then those measured by lower frequency dithering and can cause instability or slow convergence in the nominal controller.

The simplest example of this would be if the high frequency response were 180 degrees out of phase from the low frequency response due to an interspersed mode. Then the gradient estimator would produce a gradient signal with the opposite sign than the low frequency gradient and in effect drive the controller in a direction away from optimal optical coupling.

Consider the case where dynamic effects become important, in this case the perturbed response to the dither inputs, $\delta P_i$, will have different amplitudes and phases with respect to the dither inputs.

$$P(t) = \bar{P} + \delta P = \quad (19)$$

$$\bar{P}(t) + [\delta P_1(\omega_1) \; \delta P_2(\omega_1) \; \delta P_3(\omega_2) \; \delta P_4(\omega_2)] \begin{bmatrix} \sin(\omega_1 t + \varphi_1) \\ \cos(\omega_1 t + \varphi_2) \\ \sin(\omega_2 t + \varphi_3) \\ \cos(\omega_2 t + \varphi_4) \end{bmatrix} + \text{HOT}$$

where $\delta P_1(\omega_1)$ represents the magnitude of the system transfer function, $H_1(s)$, in Eq. (11) at $s=i\omega_1$. As can be seen, the power responses are no longer necessarily orthogonal to the input dither signals because of the phase delays nor will the gradient estimate be proportional to the low frequency gradient because of the frequency dependence in the magnitude of the system transfer function.

These effects can be compensated by using a dynamic Dither Filter 83 which will help account for plant dynamics. The dynamic filter should have the property of causing the same phase delay of the dither signal as would be seen in the plant response. The filtered dither and the plant response would then be back in phase and properly orthogonal. If we denote the dither filter for the ith channel as $D_i(s)$, then if:

$$D_i(s) = \frac{H_i(s)}{|H_i(s)|} \quad (20)$$

where $H(s)$ is a pre measured or modeled estimate of the system transfer functions in Eq. 11, the filtered dither signals will have the same phase relative to the input dithers as the power signal. Thus the orthogonality conditions will be maintained.

Likewise, the amplitude can be adjusted so that the time averaged product of the filtered dither signal and the power yield an estimate of the low frequency gradient. Combining all effects:

$$D_i(s) = \frac{2 H_i(s) |H_i(0)|}{d_i^2 |H_i(s)||H_i(i\omega_i)|} \quad (21)$$

The ratio $$\frac{|H_i(0)|}{|H_i(i\omega_i)|}$$

compensates for dynamic amplification occurring in the perturbed power signal at the dither frequency, $\omega_i$. With the Dither Filter 83 in place as above the gradient estimator then produces an estimate of the low frequency response of the system to changes in the control input even though the dither is occurring at high frequency.

As increasingly faster switching is asked for, the dither frequencies must be pushed higher into the range where dynamic effects in the plant become important. It is therefore necessary compensate for the dynamics of the plant in the gradient estimator at some point.

It should be noted that this has been one example of a dynamic gradient estimator 81 which is representative of a broad class of dynamic estimators such as Kalman Filters or Extended Kalman Filters, or other dynamic functions for estimating system internal states, system parameters, or other important indicators of the system. Likewise the filtering can be done at different locations and on different signals in order to achieve comparable effects of compensating for plant dynamic behavior.

Nominal Controller

The Gradient Estimator 81 provides a measure of the gradient of the power with respect to individual nominal control inputs ($\bar{u}$) 74. To achieve maximum power, the gradient signal is integrated 78 and fed to become the nominal component 74 of the actuator drive (system input) signals 70, 71.

The performance of the control algorithm in this particular embodiment can be described as follows. A maximum occurs when the gradients of the optical power with respect to the control signals are all zero. A positive gradient implies increasing power with respect to positive change in the respective control signal. Therefore, by setting the control input to some initial value plus the integration of the gradient, positive gradients integrate toward increasing control values and thereby increasing power levels. Likewise, negative gradients imply decreasing power levels with positive change in control signals. The integration of the negative value results in lowering the control signal and thereby raising the optical power level. Assuming the power is continuous with respect to control signal, the point of maximum power transmission is thus associated with zero gradients with respect to the control signals. The integration based control acts to change the control signal so as to always move in the direction of increasing power, and thereby driving the system to control values which are associated with zero gradients (i.e., the power maximum). The system remains at the maximum, since there is no change to the control caused by the integration of a zero gradient. Any perturbation away from maximum power level, such as caused by external disturbances or changes in the plant, will result in a correcting signal that brings the power back to its peak possible value. Thus the system is stable.

This is, in effect, a numerical implementation of a steepest ascent maximization algorithm (related to the steepest descent minimization algorithm).

It should be noted that the nominal controller 82 acts to control the nominal control signal into which the dither signal is summed as a small perturbation. Alternatively, more sophisticated methods of using the gradient information can be employed by the nominal controller 82. In general, since both the gradient of optical power with respect to the control signal as well as the optical power level itself are available at any given set of control inputs, it is possible to think of the controller 20 as implementing any of a large family of maxima and minima search algorithms known in the art in addition to steepest ascent method. These would include conjugate gradient methods, such as Fletcher-Reeves algorithm or Polak-Ribiere algorithm, or quasi- Newton or variable metric methods, such as Davidson-Fletcher-Powell (DFP) or Broyden-Fletcher-Goldfarb-Shanno (BFGS) methods.

By continuously adjusting the nominal component of the actuator drive signals 70, 71, the closed-loop controller 20 can compensate for environmental effects such as changes in temperature, aging of actuators, mechanical deformations, or vibrations. Such disturbances would cause movement of the beam-steering element from the optimal position, which would be observed by the controller upon demodulation of the power signal. Since disturbances result in a non-zero angle-error, the nominal component of the actuator drive signal is then corrected by the controller to bring the beam-steering elements into optimal alignment.

The preceding paragraphs describe a controller which uses nothing but the power signals and its gradients to maximize the power thought the switch. The nominal controller 82 can also use model information for the plant, perhaps obtained by calibration or system probing. This model information can include a mathematical model of the plant and dependencies of the optical power throughput on control signals. This model based controller can use this information to compute the values of the nominal control which will maximize power (minimize loss). For example if it assumed that the Power Function is roughly Gaussian with respect to the control inputs (the log is quadratic) as in Eqns 7 and 8, then an estimate can be made for the optical control values based on only a few power measurements and gradients. This can act to speed up convergence of the nominal controller to its optimum values if the model is accurate. Design of controllers which are insensitive to model errors is the field of robust control theory and techniques are known in the art.

Before the closed-loop control algorithm starts, the integrators must be initialized 80. The initialization values are based on the final actuator values from the open-loop controller 28. The value of each integrator is set to the final voltage level of the open-loop controller minus the initial modulation signal of the selected axis. This ensures continuity of output signals as control is transferred from the open-loop algorithm to the closed-loop algorithm.

In addition to the orthogonality requirement, the selection of the dither signals can minimize the ripple that is observed in the peak power signal.

For example, the four dither signals can be sinusoidal signals at four different frequencies. While these signals are orthogonal, they can produce a large ripple near peak power.

As mentioned above, in a preferred embodiment, one of the ports (e.g. the source) is driven with cosine and sine signals on the x- and y-axes, respectively, and the other port (e.g. the target) is driven with cosine and sine signals at a higher frequency. The preference for this choice can be seen by briefly ignoring the dynamics H(s), and considering the case where angle sensitivity of the beam-steering device is nearly equal in the x- and y-directions (i.e. $a_1$, $a_2$ and $a_3 \approx a_4$). Thus the coupled power will be $$\log P = \log P_0 - a_1 A^2 \cos^2(\omega_1 t) - a_2 A^2 \sin^2(\omega_1 t) - \\ a_3 A^2 \cos^2(\omega_2 t) - a_4 A^4 \sin(\omega_2 t) \\ \approx \log P_0 - a_1 A^2 - a_3 A^2 \quad (22)$$

Since the power signal in Eq. (22) is then not a function or time, with this choice, a much smaller ripple is observed in the power signal. Also, since the power signal is dependent on the dither amplitude, larger dither amplitude could be used to implement a variable optical attenuator function where the optical signal is attenuated from the maximum value to some determined lower value. In general if the optical power shape coefficients, $a_1$ and $a_2$ (and likewise $a_3$ and $a_4$) are not exactly equal the dither amplitudes on the individual channels can be adjusted independently to minimize ripple in the power signal. And also controllable attenuate the optical power through the switch.

In actual implementation several other signal conditioning measures are incorporated into the nominal controller 82 to ensure stability and rapid convergence of the controller:

The gradient estimation process described above assumes that the nominal component of the control signals varies slowly relative to the frequency of the modulation signals. Too rapid a change in the integrator values can cause errors in the estimate of the power gradients, and can result in controller instability. To avoid this instability, the output of the low-pass filter 77 can be scaled and passed through a saturation function to limit the integrator rate. The rate limit is selected such that at maximum rate, the sum of the integrators and x-y dither signals still produce a roughly circular pattern rather than an exaggerated cycloid, when plotted as an (x,y) graph. Alternatively, instead of using a rate limit, the nominal component of the control signal can be passed through a low-pass filter 80. In addition, the filter 80 can be designed with a notch at the first system resonance or other feature so as to filter out the components of the time varying nominal control signal 74 which could kick up system dynamic response such as resonant behavior. Thus it can be an advantage to have dynamic filters in the nominal controller, which are themselves dependent on the plant dynamics. This is one example of a class of dynamic compensators which utilize dynamic models of the plant to optimize control trajectories.

In still further aspects of the present invention, variable modulation amplitudes are employed to maximize convergence speed. As described above, the integrator rate must be limited such that the output to the actuator does not deviate too much from a circle. If larger modulation amplitudes are used, the integrator rate limit may be proportionally increased. This would lead to faster convergence. However, a large modulation amplitude causes additional insertion loss. In the preferred embodiment, the modulation amplitude is initially ramped to a large value and then reduced once peak optical coupling is achieved. This enables rapid nullification of alignment errors as well as a low final insertion loss. Predetermined or adaptive dither amplitude control is carried out by the dither amplitude controller 79.

Figure 7:
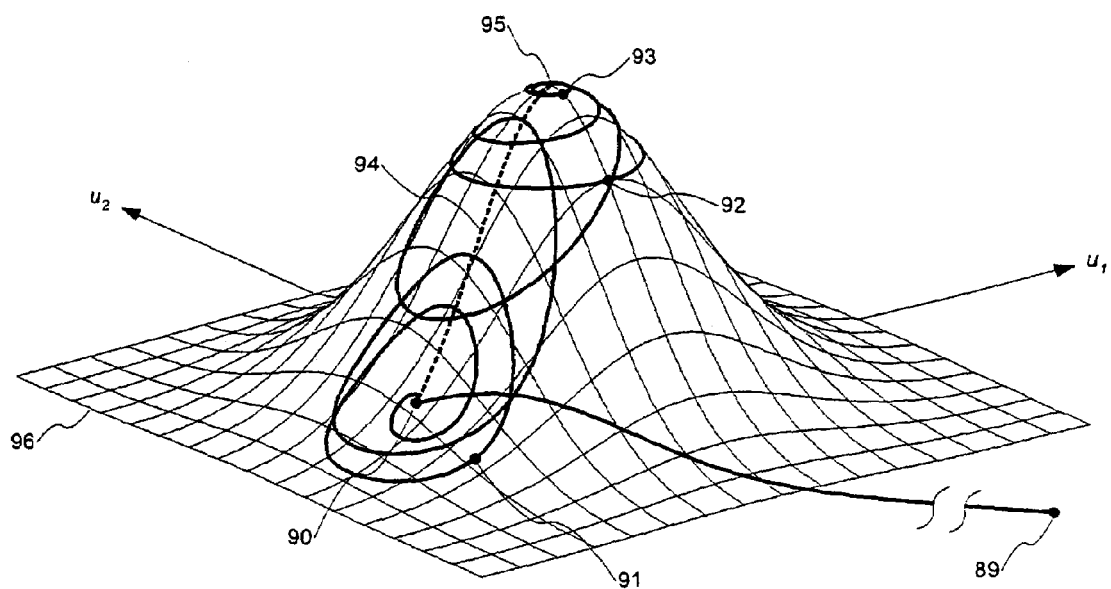
FIG. 7 is a mesh contour of power levels of optical coupling between ports in the switch.

FIG. 7 shows a mesh surface 96 that represents the optical power measured between a source port 1 and target port 2 (FIG. 1A) as a function of the electrical control signals of one of the ports. This illustrates the variable dither amplitude control during closed loop operation. The solid line on the contour of the mesh surface 96 shows the path followed by the complete control signal (DC component plus dither) from open-loop to closed-loop operation during an optical switch. The dotted line shows the path of the just the DC component.

During the closed loop operation in this example, the dither amplitude is ramped to a large value at the start 89 of the closed-loop to maximize the convergence to the optimal average control voltages, corresponding to the peak optical power 95. The dither amplitude is ramped down toward the end to maximize the final optical power once the optimal average control voltages are achieved.

The dashed line 94 represents the nominal power response, $\bar{P}$, of the system to the nominal control signal, $\bar{u}$, using a steepest assent algorithm. It should be understood that various algorithms may be employed to locate the optimum control point 95 associated with delivery of the maximum optical power between the source and target ports. At this optimal point 95, there are zero alignment errors of one port. The same applies for the other port. The mesh 96, or surface of optical power is a function of two electrical control signals (i.e., in the x and y axes) for one port. This graphic is for visualization purposes only, in actuality the power can be thought of as dependent on the 4 control inputs when combining Eqs. (3) and (7) and considering the quasi static reponse only (i.e., ignoring dynamic effects and considering only an algebraic relation between control inputs and power).

Figure 8:
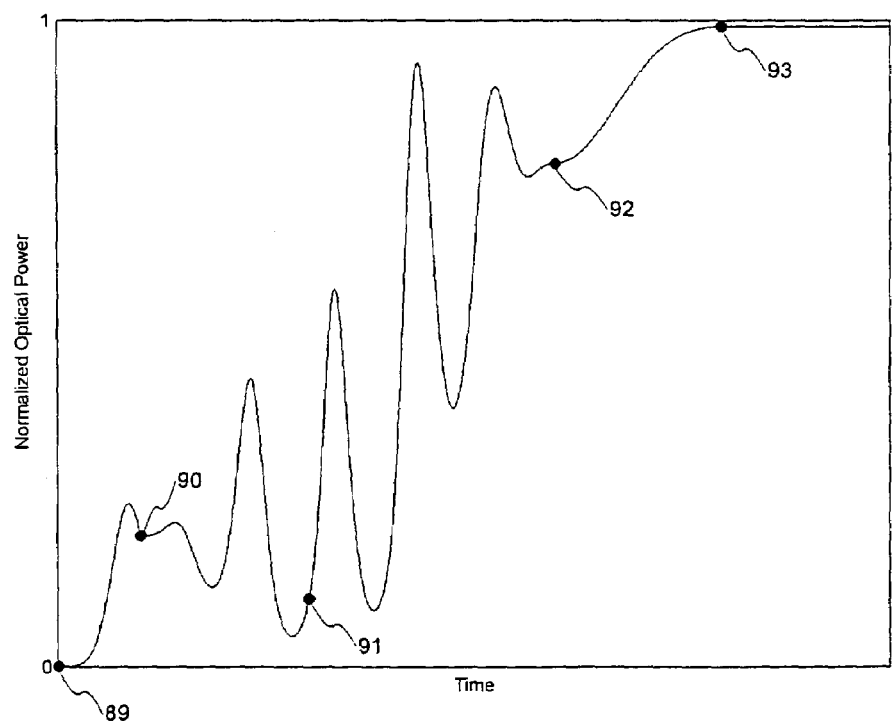
FIG. 8 is a plot of the optical power during closed-loop optimization.

FIG. 8 shows the optical output power measurement as a function of time of the solid path shown in FIG. 7. The starting point 89 of the path followed by the complete control signal is somewhere in the open-loop portion of operation. This starting point 89 could start from a no-light condition, such as where the source port 1 is not directed to a target port 2. Alternatively, the starting point 89 could start from another optical connection.

Once an optical connection has been made between the source port and desired target port, a transition 90 from open-loop to closed-loop control (i.e., optical closed-loop control) occurs. The transition 90 occurs at the end of the open-loop operation. The controller is initialized for closed-loop operation following this transition 90, and the dither amplitude is ramped up to a given level 91. Once reaching this ramped up level 91, the dither amplitude is held constant for a given amount of time. The duration of the ramp is a trade-off between speed and not exciting unintended physical system dynamics. It should be understood that the dynamic compensation ensures that the path followed by the complete control signal, and, thus, the path of just the DC component of the control signal travels to the optimal point that delivers maximum optical power between the source and target ports.

At a certain point 92, the dither amplitude is ramped down to home in on the peak amplitude. The ramping down continues until a zero gradient has been achieved. Once a zero gradient has been achieved, the mean control signal is determined to be optimum. The zero gradient also indicates that the alignment errors have been nullified between the source and target ports. Ramping down the dither amplitude is also used to reduce insertion loss to a minimum.

At point 93, the ramping down of the dither amplitude is finished. Some residual dither amplitude may be used to maintain control in the presence of slowly varying effects, such as time and temperature dependent perturbations, electronic drift, actuator aging, and so forth.

The path followed by the complete control signal following the transition 90 from open-loop to closed-loop is open-loop scheduled. In other words, an estimate of the amount of time it will take for the gradient to reach zero is used for ramping up, remaining constant, and ramping down the circles generated by the dither amplitude. Alternative techniques may be employed, such as an adaptive schedule, where the gradient determines the dither amplitude to increase or decrease. For example, at the bottom of the contour, the dither amplitude may be relatively small. Upon reaching a steeper point 90, 91 of the contour of the mesh 96, the dither amplitude may be increased to rapidly ascend the contour. Once the gradient of the contour is detected as beginning to become less steep, such as at point 92, the adaptive controller could begin to ramp down the dither amplitude until reaching the optimal point 95.

When closing the loop on optical power, the controller 20 causes the link to achieve a certain prescribed loss, usually as low as possible (but potentially controllable for variable optical attenuation (VOA) functionality). To do this, a small high frequency modulation signal is superimposed on the actuator signals. By appropriate phasing of the modulation signal going to each of the actuators, the optical beam or articulating element (lens of fiber) is caused to trace out a small orbit about a nominal position. This will cause a small modulation of the optical power signal. Appropriate convolution and filtering of the optical power and input modulation signals can be used to obtain the optical power gradient information (power changes associated with small perturbations of each of the actuators in the transmit and receive elements). The gradient information is then used to close the loop on the actuators and achieve the desired optical power level. Both the transmit and receive elements can thus be driven with modulation at two different frequencies, and the power signal appropriately narrow band filtered to discriminate effects caused by the transmit and receive actuation independently.

The individual ports of the switch may therefore be used as a variable optical attenuator. As a variable optical attenuator, the switch can be used to balance the channels being multiplexed together in optical pipes extending from the switch. Balancing the power of the individual channels makes the overall network operate more efficiently. A controller coupled to the ports may receive a request for a given power level for a subset of the channels and convert that request to dithering amplitudes for each of the channels. Alternative components, such as an automatic feedback loop, may also be used to set the variable optical attenuator power levels of each of the channels.

Figure 10:
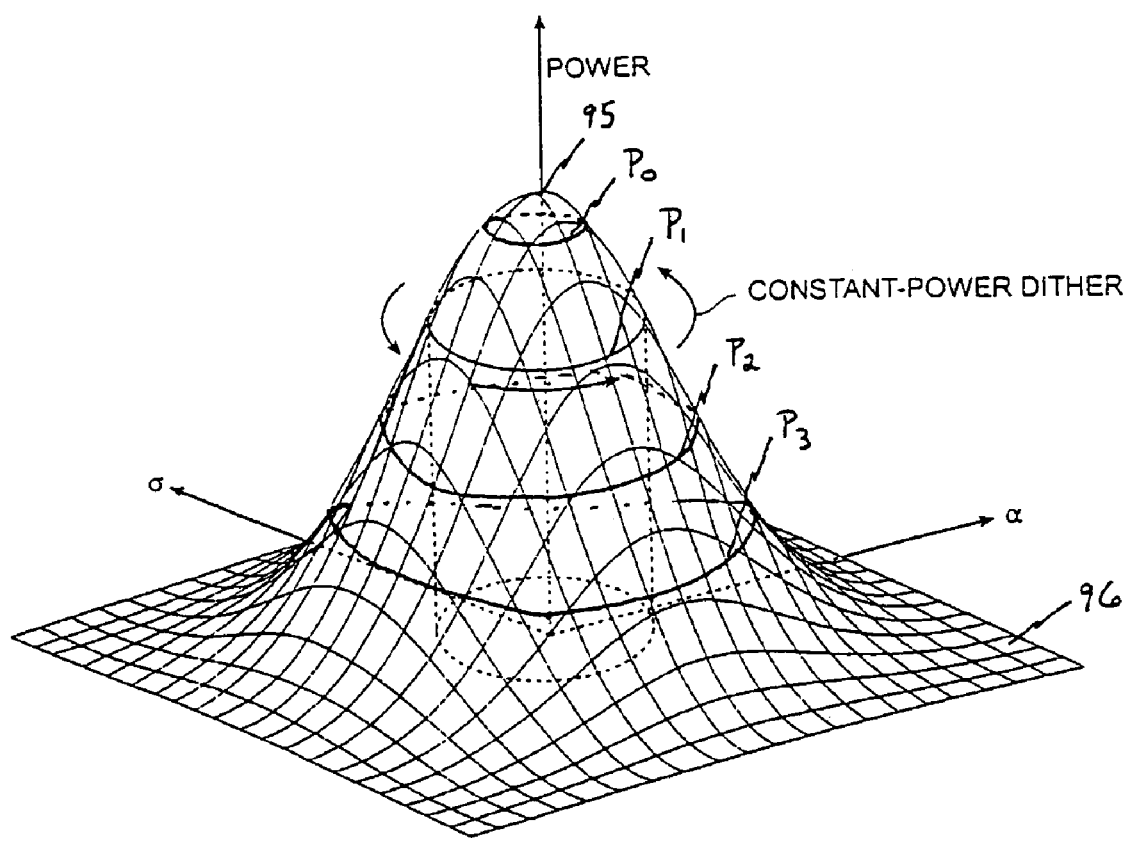
FIG. 10 is a mesh contour illustrating use of the switch as a variable optical attenuator.

FIG. 10 is a graphical diagram of the mesh surface 96 that includes indications of power levels P0, P1, P2, and P3. Each of these power level indications result from applying respective amplitudes of the quadrature dithering to provide a constant output power when the coupled power is Gaussian in the two alignment errors shown. Increasing the amplitude of the sine and cosine dithers at a given frequency, whether above or below the natural resonance of the device, produces a circular trajectory in the two alignment errors. Since the sum of the squares of these two alignment errors is constant (due to the sine and cosine dithering), the result is a constant attenuated coupled power even though the individual errors are changing. If the dithers in the target port 2 are also in quadrature form, these dithers will contribute a second constant loss term, such that the overall attenuation level due to the four dithers is constant.

Using this principle, the switch may be used as a variable optical attenuator for each of the several channels independently. In other words, by changing the amplitude of the dithering, the switch ports 1, 2 can produce power in each of the channels at P0, P1, P2, or P3, or other power levels.

It should be understood that the dither amplitudes applied to the axes of each port 1, 2 may be set independently. If the power mesh is not Gaussian in shape but more oval in shape, the dither amplitudes and/or phases may be adjusted accordingly so as to provide a constant trajectory around the circumference of the power contour to produce a constant power output for a selected variable optical attenuation.

While this invention has been particularly shown and described with references to preferred embodiments thereof, it will be understood by those skilled in the art that various changes in form and details may be made therein without departing from the scope of the invention encompassed by the appended claims.

What is claimed is:

1. A fiber optic control system comprising:
a physical plant comprising:
an input optical waveguide for providing an emitted optical beam;
a beam direction control element for controllably directing the optical beam emitted from the input optical waveguide;
a plurality of output elements, each for coupling the directed optical beam into an associated output optical waveguide;
control inputs, associated with the beam direction control element, to effect a change in direction of the optical beam towards a selected one of the output elements;
a detector, for determining a level of optical power coupled thereby to the selected output optical waveguide; and
a controller,
for generating control signals applied to the control inputs, the controller generating control signals that have been compensated for a dynamic response of the physical plant that results from an application of control signals thereto.

2. A fiber optic control system as in claim 1 wherein the controller additionally comprises:
a compensator, for compensating for at least one of phase lag, phase lead, or amplitude change in response of the physical plant.

3. A fiber optic control system as in claim 2 wherein the compensator additionally comprises:
a filter, for receiving an applied control signal, and having a transfer function that depends upon the expected dynamic response of the physical plant.

4. A fiber optic control system as in claim 2 wherein the compensator additionally comprises:
a dither filter, for receiving a dither signal, and having a transfer function that depends upon the expected dynamic response of the physical plant to the dither signal.

5. A fiber optic control system as in claim 4 wherein the compensator additionally comprises:
a multiplier, connected for multiplying the filtered dither signal and the detected optical power signal.

6. A fiber optic control system as in claim 5 wherein the compensator additionally comprises:
a filter, for filtering the multiplier output.

7. A fiber optic control system as in claim 5 wherein the compensator additionally comprises:
an integrator, for integrating the multiplier output, to produce at least one control input.

8. A fiber optic control system as in claim 7 wherein the applied control signal is a sum of a mean signal and a dither signal.

9. A fiber optic control system as in claim 8 wherein the dither signal additionally comprises a pair of orthogonal signals applied to respective control inputs.

10. A fiber optic control system as in claim 4 wherein:
the beam direction control element operates on the optical beam as emitted by the input optical waveguide;
the plurality of output elements controllably operate to couple the directed optical beam on the associated output optical waveguides;
the control signals are applied to both the beam direction control element and the plurality of output elements; and
a frequency of the dither signal applied to the beam direction control elements is different from a frequency of dither signals applied to the plurality of output elements.

11. A fiber optic control system as in claim 10 wherein the compensator additionally comprises:
a set of filters, each for receiving a respective one of four applied control signals, each filter having a transfer function that depends upon the expected dynamic response of the physical plant along a corresponding orthogonal control axis.

12. A fiber optic control system as in claim 1 wherein the control inputs are determined from time histories of the optical power level as determined by the detector.

13. A fiber optic control system as in claim 1 wherein the control inputs are determined from time histories of the position of the beam direction control element as determined by a capacitive sensor.

14. A fiber optic control system as in claim 1 wherein the control inputs excite dynamic behavior of the physical plant.

15. A method for controlling an optical beam from an input optical waveguide to one of multiple output optical waveguides, the method comprising the steps of:
controllably directing the optical beam emitted from the input optical waveguide;
effecting a change in direction of the optical beam to couple the optical beam with a selected one of the multiple output optical waveguides;
determining a level of optical power coupled to the selected one of the output optical waveguides;
generating control signals that have been compensated for a dynamic response determined during the step of controllably directing the optical beam; and
using the control signals to controllably direct the optical beam.

16. A method as in claim 15 wherein the step of controllably directing the optical beam additionally comprises:
compensating for at least one of phase lag, phase lead, or amplitude change in response.

17. A method as in claim 16 wherein the step of compensating additionally comprises:
filtering an applied control signal according to a transfer function that depends upon the expected dynamic response associated with the step of controllably directing the optical beam.

18. A method as in claim 16 wherein the step of compensating additionally comprises:
multiplying the filtered applied control signal and the detected optical power signal.

19. A method as in claim 18 wherein the step of compensating additionally comprises:
filtering the multiplier output.

20. A method as in claim 18 wherein the step of compensating additionally comprises:
integrating the multiplier output to produce at least one control signal.

21. A method as in claim 20 wherein the applied control signal is a sum of a mean signal and a dither signal.

22. A method as in claim 21 wherein the dither signal additionally comprises a pair of orthogonal signals.

23. A method as in claim 21 wherein the step of effecting a change in direction of the optical beam additionally comprises:
operating on the optical beam at the input optical waveguide as well as operating on the optical beam at the selected output optical waveguide;
operating on the optical beam at the input optical waveguide by applying a first frequency to a first orthogonal modulation signal of the pair of orthogonal signals; and
operating on the optical beam at the output optical waveguide by applying a second frequency to a second orthogonal modulation signal of the pair of orthogonal signals.

24. A method as in claim 23 wherein the step of compensating additionally comprises:
filtering each of a respective one of four applied control signals according to respective transfer functions that depend upon the expected dynamic response in directing the optical beam along a corresponding orthogonal control axis.

25. A method as in claim 15 wherein the dynamic changes in the response result from at least one of a phase lead, phase lag, or amplitude change associated with application of a control signal to an actuator used for controllably directing the optical beam and the eventual positioning of the beam.

26. A method as in claim 15 further comprising the step of:
determining control inputs for changing the direction of the optical beam as a function of time histories of the optical power level.

27. A method as in claim 15 wherein a time constant of internal states for changing the direction of the optical beam are similar to the time interval for changes in the command inputs.

28. A fiber optic control system for controlling an optical beam from an input optical waveguide to one of multiple output optical waveguides, the system comprising:
means for controllably directing the optical beam emitted from the input optical waveguide;
means for effecting a change in direction of the optical beam emitted by the input optical waveguide to couple the optical beam with a selected one of the multiple output optical waveguides;
means for determining a level of optical power coupled to the selected one of the output optical waveguides;
means for generating control signals that have been compensated for a dynamic response determined by the means for controllably directing the beam; and
means for using the control signals to controllably direct the optical beam.

* * * * *